United States Patent
Soneda et al.

(10) Patent No.: US 9,961,298 B2
(45) Date of Patent: May 1, 2018

(54) MANAGEMENT SYSTEM, CONTROL APPARATUS, AND METHOD FOR MANAGING SESSION

(71) Applicants: Takuya Soneda, Kanagawa (JP); Naoki Umehara, Kanagawa (JP); Hiroshi Hinohara, Kanagawa (JP); Atsushi Miyamoto, Kanagawa (JP); Takeshi Horiuchi, Tokyo (JP)

(72) Inventors: Takuya Soneda, Kanagawa (JP); Naoki Umehara, Kanagawa (JP); Hiroshi Hinohara, Kanagawa (JP); Atsushi Miyamoto, Kanagawa (JP); Takeshi Horiuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/237,781

(22) Filed: Aug. 16, 2016

(65) Prior Publication Data

US 2017/0064251 A1    Mar. 2, 2017

(30) Foreign Application Priority Data

Aug. 31, 2015 (JP) .................................. 2015-170371

(51) Int. Cl.
*H04N 7/14* (2006.01)
*H04N 7/15* (2006.01)
*H04L 29/06* (2006.01)

(52) U.S. Cl.
CPC ......... *H04N 7/147* (2013.01); *H04L 65/4023* (2013.01); *H04N 7/15* (2013.01)

(58) Field of Classification Search
CPC combination set(s) only.
See application file for complete search history.

(56) References Cited

U.S. PATENT DOCUMENTS

| 9,307,196 B2 | 4/2016 | Hinohara et al. | |
|---|---|---|---|
| 2003/0135609 A1* | 7/2003 | Carlson | G06F 9/5011 709/224 |
| 2009/0213746 A1* | 8/2009 | Ariyoshi | H04L 12/2697 370/252 |
| 2010/0279653 A1* | 11/2010 | Poltorak | H04M 15/00 455/410 |
| 2011/0299398 A1* | 12/2011 | Watanabe | H04B 7/155 370/236 |

(Continued)

FOREIGN PATENT DOCUMENTS

JP    2003-076623    3/2003

*Primary Examiner* — Joseph J Nguyen
(74) *Attorney, Agent, or Firm* — IPUSA, PLLC

(57) ABSTRACT

A management system for managing a session for transmitting content data between a first terminal and a second terminal via a first relay apparatus and a second relay apparatus is provided. The management system includes a determination unit configured to determine a transmission quality of the content data transmitted in the session based on a transmission quality of the content data available for the first terminal and a transmission quality available for the second terminal, a first selection unit configured to select a first relay apparatus to which the first terminal is to be connected based on the determined transmission quality, and a second selection unit configured to select a second relay apparatus to which the second terminal is to be connected.

12 Claims, 26 Drawing Sheets

(56) References Cited

U.S. PATENT DOCUMENTS

| | | | |
|---|---|---|---|
| 2013/0038676 A1* | 2/2013 | Tanaka | G06F 3/1454 |
| | | | 348/14.08 |
| 2013/0297362 A1* | 11/2013 | Yagi | G06Q 10/06 |
| | | | 705/7.12 |
| 2013/0335511 A1* | 12/2013 | Maeda | H04N 7/15 |
| | | | 348/14.08 |
| 2014/0015917 A1* | 1/2014 | Kato | H04M 3/567 |
| | | | 348/14.12 |
| 2014/0267565 A1* | 9/2014 | Nakafuji | H04N 7/141 |
| | | | 348/14.08 |
| 2014/0301249 A1* | 10/2014 | Moss | H04L 65/1069 |
| | | | 370/260 |
| 2015/0237122 A1* | 8/2015 | Wang | H04L 67/025 |
| | | | 709/227 |
| 2015/0256998 A1 | 9/2015 | Umehara | |
| 2015/0381665 A1 | 12/2015 | Horiuchi et al. | |
| 2016/0149769 A1* | 5/2016 | Joshi | H04L 41/5006 |
| | | | 715/739 |

* cited by examiner

FIG.3
| OPERATION STATE | TERMINAL ID | DESTINATION NAME |
|---|---|---|
| 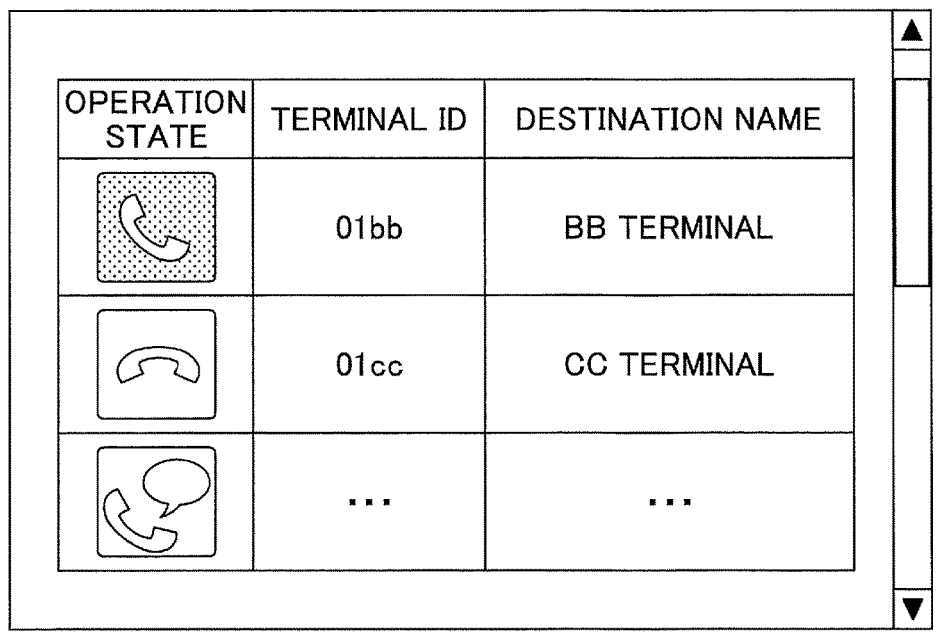 | 01bb | BB TERMINAL |
|  | 01cc | CC TERMINAL |
| 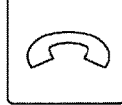 | ... | ... |

FIG.9A

| TERMINAL ID | PASSWORD | SERVICE ID |
|---|---|---|
| 01aa@xx.com | aaaa | TV CONFERENCE |
| 01bb@xx.com | abab | TV CONFERENCE, CLOUD BOARD |
| 01cc@xx.com | baba | TV CONFERENCE, MESSAGE, CLOUD BOARD |
| ... | | |

FIG.9B

| TERMINAL ID | DESTINATION NAME | OPERATION STATE | IP ADDRESS | AREA ID | RELAY APPARATUS ID | CONTRACT TYPE | SERVICE LEVEL |
|---|---|---|---|---|---|---|---|
| 01aa@xx.com | AA TERMINAL | None | 1.2.1.3 | jp01 | 001xx | PREMIUM | 10 |
| 01bb@xx.com | BB TERMINAL | None | 1.2.2.3 | us01 | 001yy | REGULAR | 8 |
| 01cc@xx.com | CC TERMINAL | None | 1.3.1.3 | sg01 | 001zz | TRIAL | 4 |
| ... | | | ... | | | ... | ... |

FIG.9C

| TERMINAL ID | |
|---|---|
| REQUEST SOURCE | DESTINATION |
| 01aa@xx.com | 01bb@xx.com |
| 01aa@xx.com | 01cc@xx.com |
| ... | ... |
| 01bb@xx.com | 01aa@xx.com |
| ... | ... |

FIG.9D

| session ID.relay apparatus ID | PARTICIPATING TERMINAL ID, TERMINAL ID | SERVICE LEVEL |
|---|---|---|
| conf01.001xx | 01aa@xx.com, 01bb@xx.com, 01cc@xx.com | 8 |
| ... | ... | ... |

FIG.9E

| RELAY APPARATUS ID | URI | OPERATION STATE | SERVICE LEVEL |
|---|---|---|---|
| 001xx | 001@xx.com | Online | 10 |
| 002xx | 002@xx.com | Online | 8 |
| 003xx | 003@xx.com | Online | 4 |
| 004xx | 004@xx.com | Offline | 3 |
| ... | ... | ... | ... |

FIG.9F

| TERMINAL ID | OPERATION STATE |
|---|---|
| 01aa@xx.com | Online |
| 01bb@xx.com | Online |
| 01cc@xx.com | Online |
| ... | ... |

FIG.9G

| TERMINAL ID | RELAY APPARATUS CONNECTION ID | RELAY APPARATUS CONNECTION PASSWORD |
|---|---|---|
| 01aa@xx.com | v.01.aa | xxxx |
| ... | ... | ... |

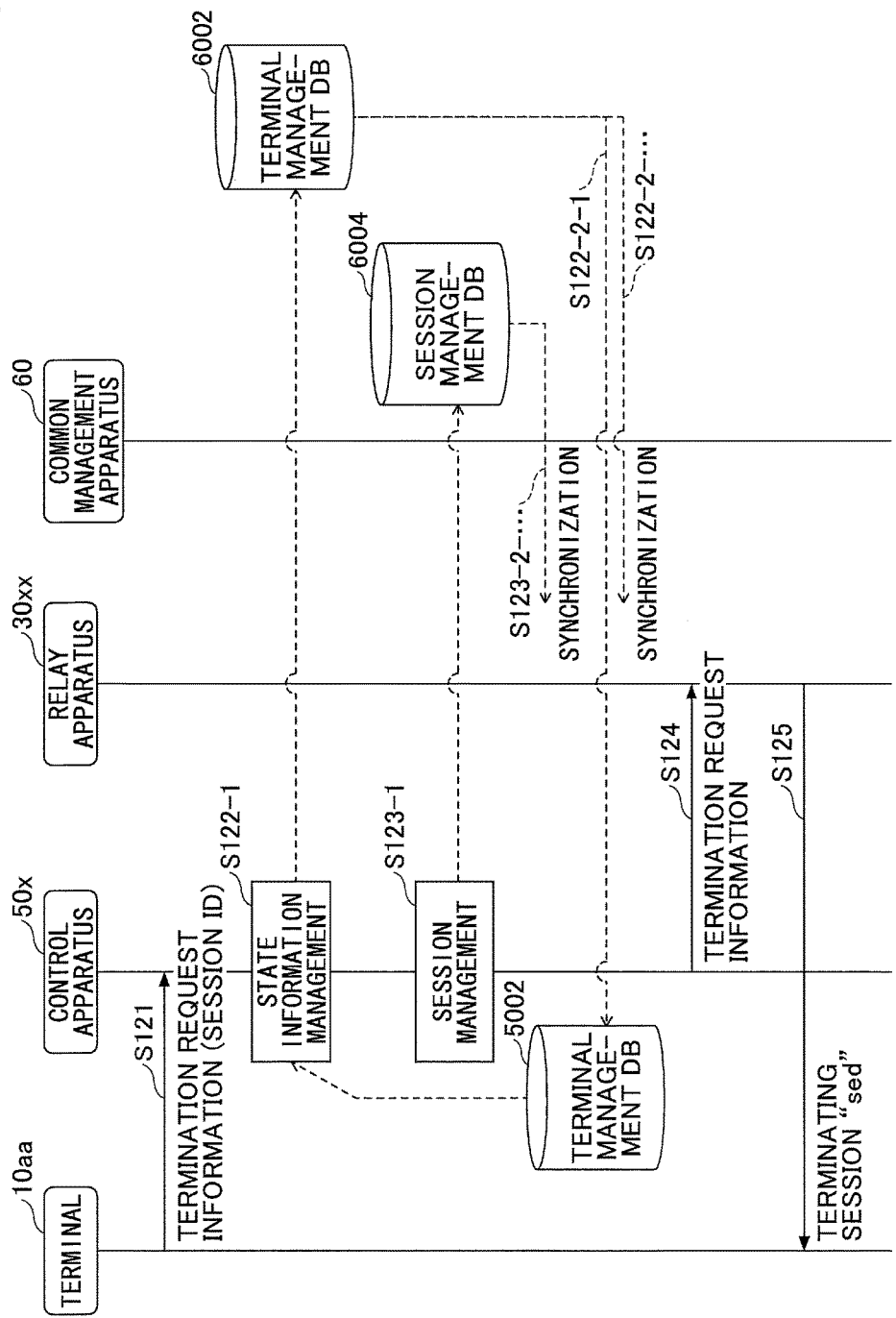

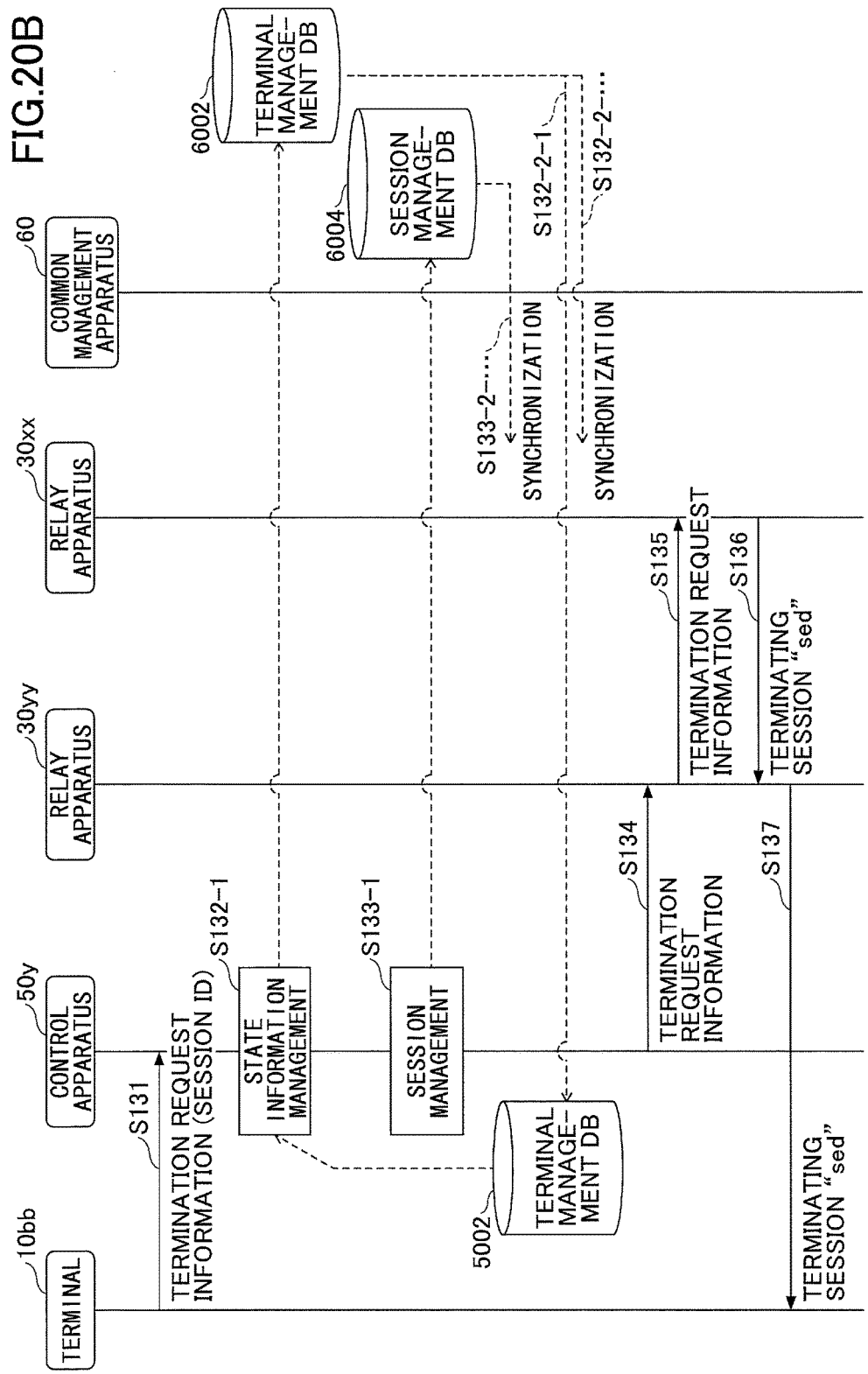

MANAGEMENT SYSTEM, CONTROL APPARATUS, AND METHOD FOR MANAGING SESSION

BACKGROUND OF THE INVENTION

1. Field of the Invention

The present disclosure relates to management systems, control apparatuses, methods for managing session.

2. Description of the Related Art

Recently, communication systems such as a TV conference system for achieving conferences and communications via a communication network including the internet and dedicated lines have become common due to requirements of saving time and money taken to move to conference room, and the like. In such a communication system, upon a communication starting between communication terminals, content data such as image data and sound data is transmitted, thereby achieving communications between participants of the conference.

Also, in Japanese Unexamined Patent Application Publication No. 2003-076623, a technology is disclosed, in which a communication terminal selects a server to communicate with the server so as to achieve an optimal communication condition.

RELATED ART DOCUMENT

Patent Document

[Patent Document 1]: Japanese Unexamined Patent Application Publication No. 2003-076623

SUMMARY OF THE INVENTION

An object of the present disclosure is to provide a communication technology for enabling the content data transmission using a plurality of relay apparatuses in accordance with a service quality that is available for a plurality of terminals.

The following configuration is adopted to achieve the aforementioned object.

In one aspect of an embodiment of the present disclosure, there is provided a management system for managing a session for transmitting content data between a first terminal and a second terminal via a first relay apparatus and a second relay apparatus. The management system includes a determination unit configured to determine a transmission quality of the content data transmitted in the session based on a transmission quality of the content data available for the first terminal and a transmission quality available for the second terminal, a first selection unit configured to select a first relay apparatus to which the first terminal is to be connected based on the determined transmission quality, and a second selection unit configured to select a second relay apparatus to which the second terminal is to be connected.

Other objects, features, and advantages of the present disclosure will become apparent from the following detailed description when read in conjunction with the accompanying drawings.

BRIEF DESCRIPTION OF THE DRAWINGS

FIG. 3 is a diagram schematically illustrating an example destination list.

FIG. 9A is a diagram schematically illustrating an authentication management table.

FIG. 9B is a diagram schematically illustrating a terminal management table.

FIG. 9C is a diagram schematically illustrating a destination list management table.

FIG. 9D is a diagram schematically illustrating a session management table.

FIG. 9E is a diagram schematically illustrating a relay apparatus management table.

FIG. 9F is a diagram schematically illustrating an operation state management table.

FIG. 9G is a diagram schematically illustrating a connection management table.

FIG. 20A is a sequence diagram illustrating an example process in which a terminal exits from the session.

FIG. 20B is a sequence diagram illustrating another example process in which a terminal exits from the session.

DETAILED DESCRIPTION OF THE PREFERRED EMBODIMENTS

In the following, embodiments of the present disclosure will be described with reference to accompanying drawings.

<Overview of Communication System>

Figure 1:
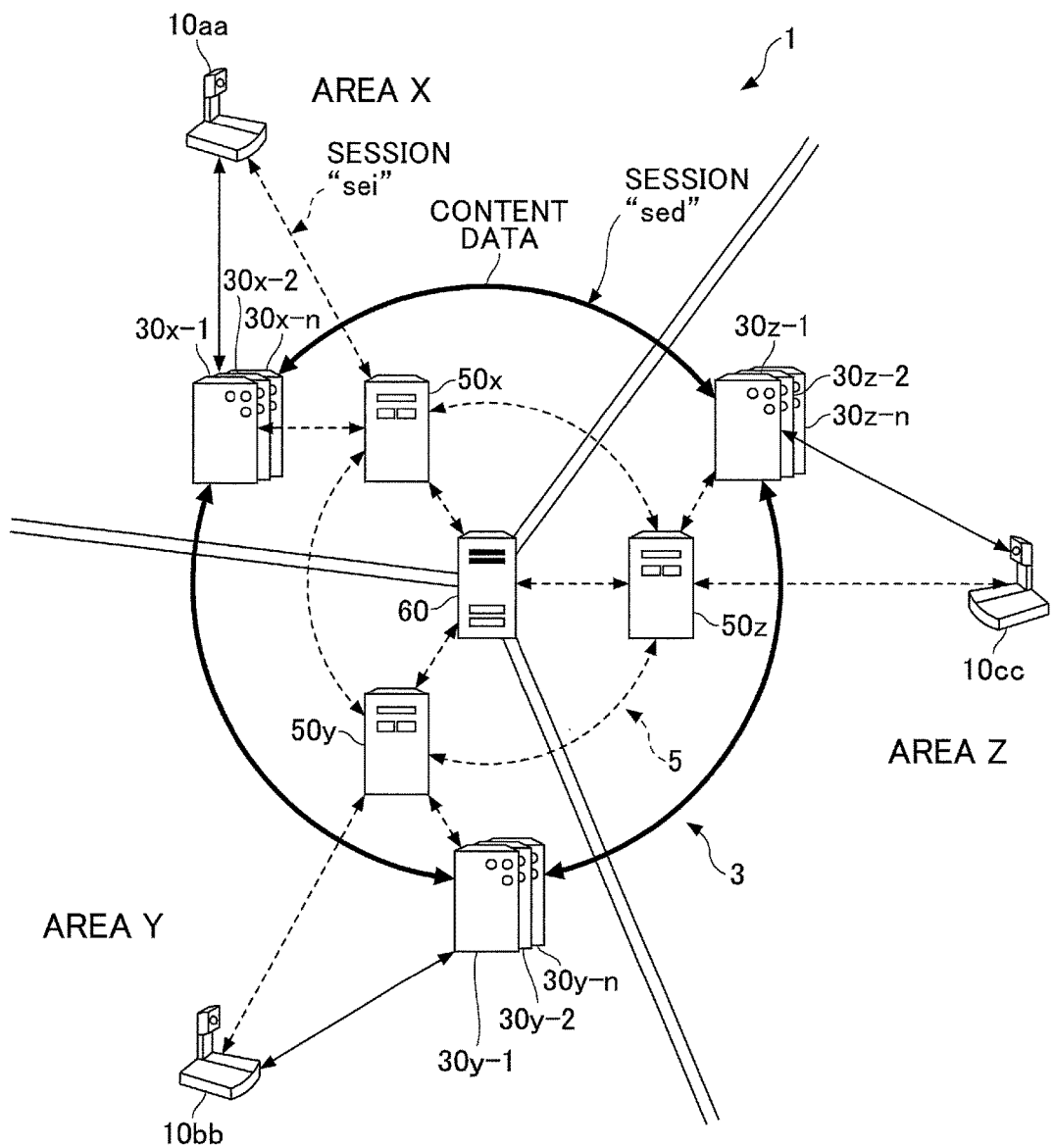
FIG. 1 is a diagram for schematically illustrating a communication system of an embodiment of the present disclosure.

A communication system of an embodiment of the present disclosure will be described with reference to FIG. 1. FIG. 1 is a diagram for schematically illustrating transmission/reception of respective information items in a communication system 1. In the following, a communication terminal is simply referred to as "terminal".

The communication system 1 of the present embodiment includes a plurality of terminals 10aa, 10bb, and 10cc, a relay system 3, and a management system 5.

The relay system 3 includes a plurality of relay apparatuses 30x-1, 30x-2, . . . 30x-n, 30y-1, 30y-2, . . . 30y-n, 30z-1, 30z-2, . . . 30z-n.

The management system 5 includes a plurality of control apparatuses 50x, 50y, and 50z and a common management apparatus 60.

In the following, an arbitrary terminal among the terminals 10aa, 10bb, and 10cc is referred to as "terminal 10". Also, an arbitrary relay apparatus among the relay apparatuses 30x-1, 30x-2, . . . 30x-n, 30y-1, 30y-2, . . . 30y-n, 30z-1, 30z-2, . . . 30z-n is referred to as "relay apparatus 30". Also, an arbitrary control apparatus among the control apparatuses 50x, 50y, and 50z is referred to as "control apparatus 50".

In the example illustrated in FIG. 1, the control apparatus 50x, and the relay apparatuses 30x-1, 30x-2, . . . 30x-n are located in an area X. The control apparatus 50y, and the relay apparatuses 30y-1, 30y-2, . . . 30y-n are located in an area Y. The control apparatus 50z, and the relay apparatuses 30z-1, 30z-2, . . . 30z-n are located in an area Z.

In the area X, capability of the relay apparatus for achieving higher quality of service increases in the order of the relay apparatuses 30x-1, 30x-2, . . . 30x-n. That is, the relay apparatus 30x-1 is capable of providing highest communication service quality among the relay apparatuses in the area X, whereas the relay apparatus 30x-n has the lowest capability for achieving the communication service quality among the relay apparatuses in the area X. Similarly, in the area Y, capability of the relay apparatus for achieving higher quality of service increases in the order of the relay apparatuses 30y-1, 30y-2, . . . 30y-n. In the area Z, capability of the relay apparatus for achieving higher quality of service increases in the order of the relay apparatuses 30z-1, 30z-2, . . . 30z-n.

The respective terminals 10 perform communication through transmission/reception of content data. Also, one or more relay apparatuses 30 relay the content data between the terminals 10. Accordingly, one or more sessions are established among terminals 10 so as to achieve one or more content data transmission operations. In the following, the one or more sessions for transmitting the content data referred to as session(s) "sed".

Communication between offices, communication within an office, communication between rooms in the same office, communication between indoor terminal and outdoor terminal or between outdoor terminals, etc., can be achieved when the terminal 10 participate in the session "sed" to exchange the content data between the terminals. Additionally, in a case where the terminal 10 is used as an outdoor terminal, wireless communication using a mobile communication network, etc., may be performed.

The communication system 1 operates as described above. The communication system is provided for mutually transmitting information, emotion, etc., between a plurality of communication terminals by establishing the session "sed" via a communication management system (corresponding to the management system).

In the present embodiment, a video conference system is an example communication system, a video conference management system is an example communication management system, and a video conference terminal is an example communication terminal. That is, the terminal and the management system of the present disclosure may be applied not only to the video conference system but also to other communication systems. That is, the communication system 1 may be a telephone system, and the terminal 10 may be an IP (Internet Protocol) phone, an internet telephone, PC (Personal Computer), and the like. Additionally, a term "TV conference" may be used instead of a term "video conference".

Moreover, in the following, descriptions are given assuming that a conversation between participants is provided through terminals (specific concept) of the video conference system, etc. (more specific concept). However, communications performed in embodiments of the present disclosure may be not limited to the conversation but may include various types of communications. For example, the communication system 1 can be used when an application program installed in a computer accesses a server in a data center so as to transmit/receive various types of data. In this case, a counterpart in the communication may be a server (not a terminal). Also, the terminal includes a game machine and a car navigation apparatus. Also, the communication system 1 is an information sharing system, and the terminal 10 may be a projector, a digital signage, an interactive white board.

In the communication system 1 of the present embodiment, the content data transmitted between the terminals 10 is divided into four types of data, which are high-resolution image data, middle-resolution image data, low-resolution image data, and sound data. Additionally, image of the image data may be moving image, still image, or moving image and still image. A frame of low-resolution image data includes 160 pixels in lateral direction and 120 pixels in longitudinal direction, which is used as a basic image. A frame of middle-resolution image data includes 320 pixels in lateral direction and 240 pixels in longitudinal direction. For example, a frame of high-resolution image data includes 640 pixels in lateral direction and 480 pixels in longitudinal direction. In the present embodiment, in a case where a transmission band of communication path between terminals 10 is narrow, image data of low image quality including only low-resolution image frames that are basic images are relayed. In a case where the transmission band of communication path between terminals 10 is relatively wide, image data of middle image quality including low-resolution image frames (basic images) and middle-resolution image frames are relayed. Also, in a case where the transmission band of communication path between terminals 10 is wide, image data of high image quality including low-resolution image frames (basic images), middle-resolution image frames, and high-resolution image frames are relayed. The sound data is transmitted with a predetermined quality regardless of the transmission bandwidth because an amount of the sound data is far smaller than an amount of image data.

In FIG. 1, although three relay apparatuses 30 relay the content data between three terminals 10, this is not a limiting example. For example, in the communication system 1, two relay apparatuses 30 may relay the content data between three terminals 10, and three relay apparatuses 30 may relay the content data between two terminals 10.

The common management apparatus 60 manages respective information items commonly used by respective control apparatuses 50, where the managed information items relates to terminal 10, or the session "sed" between the terminals 10.

The session for transmitting respective information items between the terminals 10 is established through the control apparatus 50. In the following, the session for transmitting the information items is referred to as session "sei". The respective information items transmitted between the terminals 10 include a communication start request, an acceptance of communication start, a communication termination request, and the like. The respective control apparatuses 50 can recognize states of terminals 10 based on the respective information items transmitted from the terminals 10.

Figure 2:
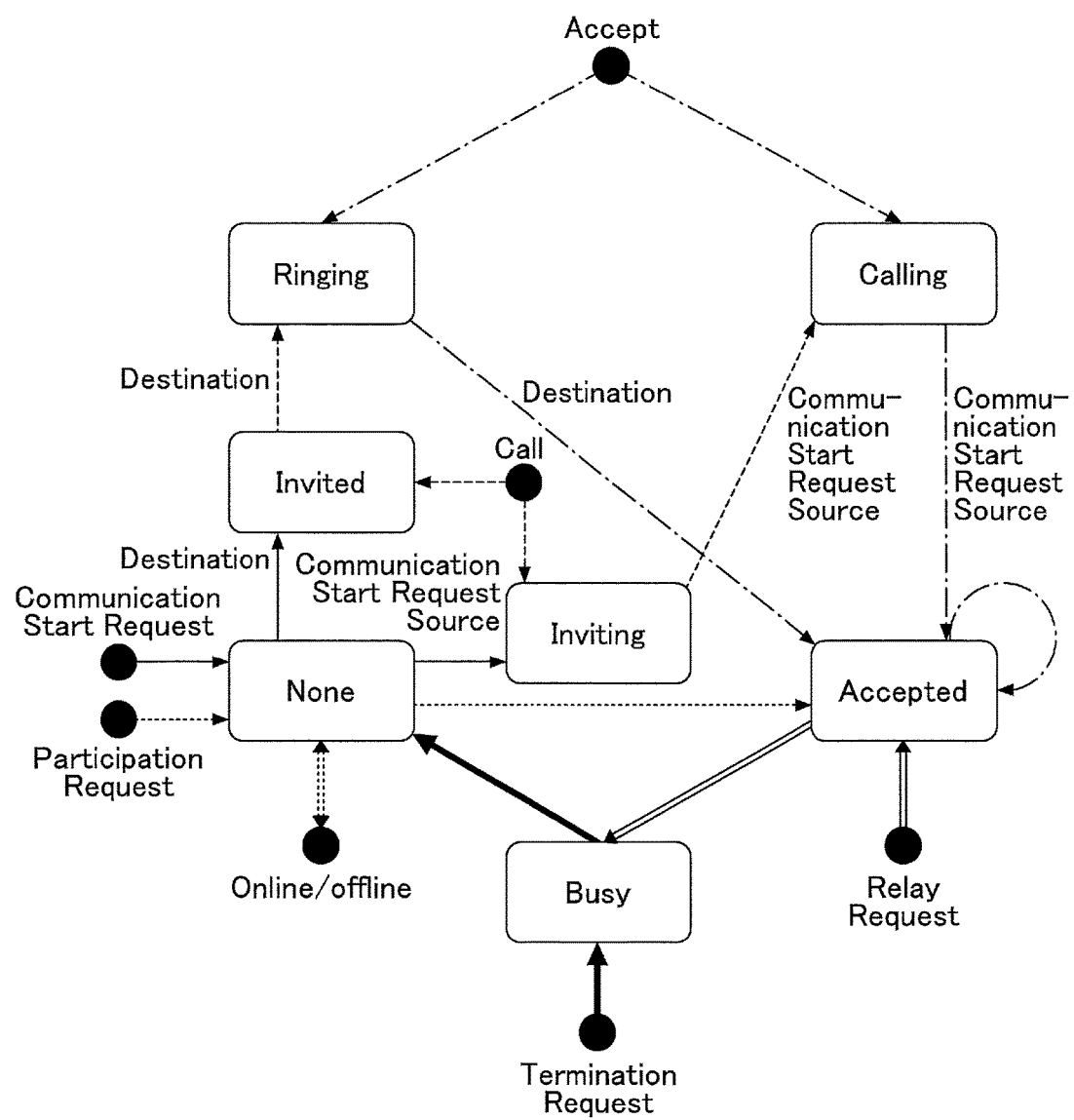
FIG. 2 is a state transition diagram illustrating an example state transition of a terminal.

FIG. 2 is a state transition diagram illustrating an example state transition of the terminal 10. In FIG. 2, state information, such as "None", for indicating the state of the terminal 10 is depicted in respective boxes. When a terminal 10 logs in the control apparatus 50 to be connected online, the terminal 10 is in a standby state (indicated by state information "None"). When the terminal 10 requests to start communication with another terminal 10, the request source (source of communication start request) terminal 10 is in a communication state of requesting communication with another terminal 10 (indicated by state information "Inviting"), and the destination terminal 10 is in a communication state of being requested communication start from another terminal (indicated by state information "Invited"). When the destination terminal 10 outputs ring alert, the destination terminal 10 is in a communication state of ring alert (indicated by state information "Ringing"), and the request source terminal 10 is in a communication state of outputting dial tone (indicated by state information "Calling"). When the destination terminal 10 accepts the communication start request, the request source terminal 10 is in a communication state of being accepted the communication start request (indicated by state information "Accepted"). When the terminal 10 requests to start relay operation of the content data, the terminal 10 is in a communication state of communicating (indicated by state information "Busy"). When the terminal 10 requests to terminate the communication, the request source terminal 10 returns to the communication state indicated by the state information "None". On the other hand, when the terminal 10 requests to participate in an established session "sed", the request source terminal 10 is in the communication state indicated by the state information "Accepted". Additionally, the state transition rule described above is not a limiting example, and other rules may be applied to the communication system 1.

In storage units 5000 of respective control apparatuses 50, information indicating the state transition rule illustrated by FIG. 2 is stored. Thus, for example, when a communication start request is transmitted from a terminal 10, the control apparatus 50 transmits the communication start request to a destination terminal 10 upon detecting that the communication state of the request source terminal is "None", while the control apparatus 50 denies the communication start request upon detecting that the communication state of the request source terminal is not "None". In this way, the control apparatus 50 can precisely control calls between the terminals 10.

Also, respective control apparatuses 50 manage operation state (presence) of every terminal 10 in order, for example, to report the operation state to the user of the terminal 10. A state "Online" in which the terminal 10 communicates with the control apparatus 50 while communicates with no other terminals 10, a state "Online (Busy)" in which the terminal 10 communicate with the control apparatus 50 and communicate with another terminal 10, and a state "Offline" in which the terminal 10 does not communicate with the control apparatus 50 are included in the operation state of the terminal 10. Each of the control apparatus 50 transmits operation states of terminals 10 that are candidates of destination terminals to terminals 10 connected to the own control apparatus 50. In the terminal 10, in response to receiving the operation states from the control apparatus 50, a display control unit 17 updates an icon indicating the operation state to be displayed in a destination list (see FIG. 3) based on the transmitted operation states.

<Hardware Configuration>

Figure 4:
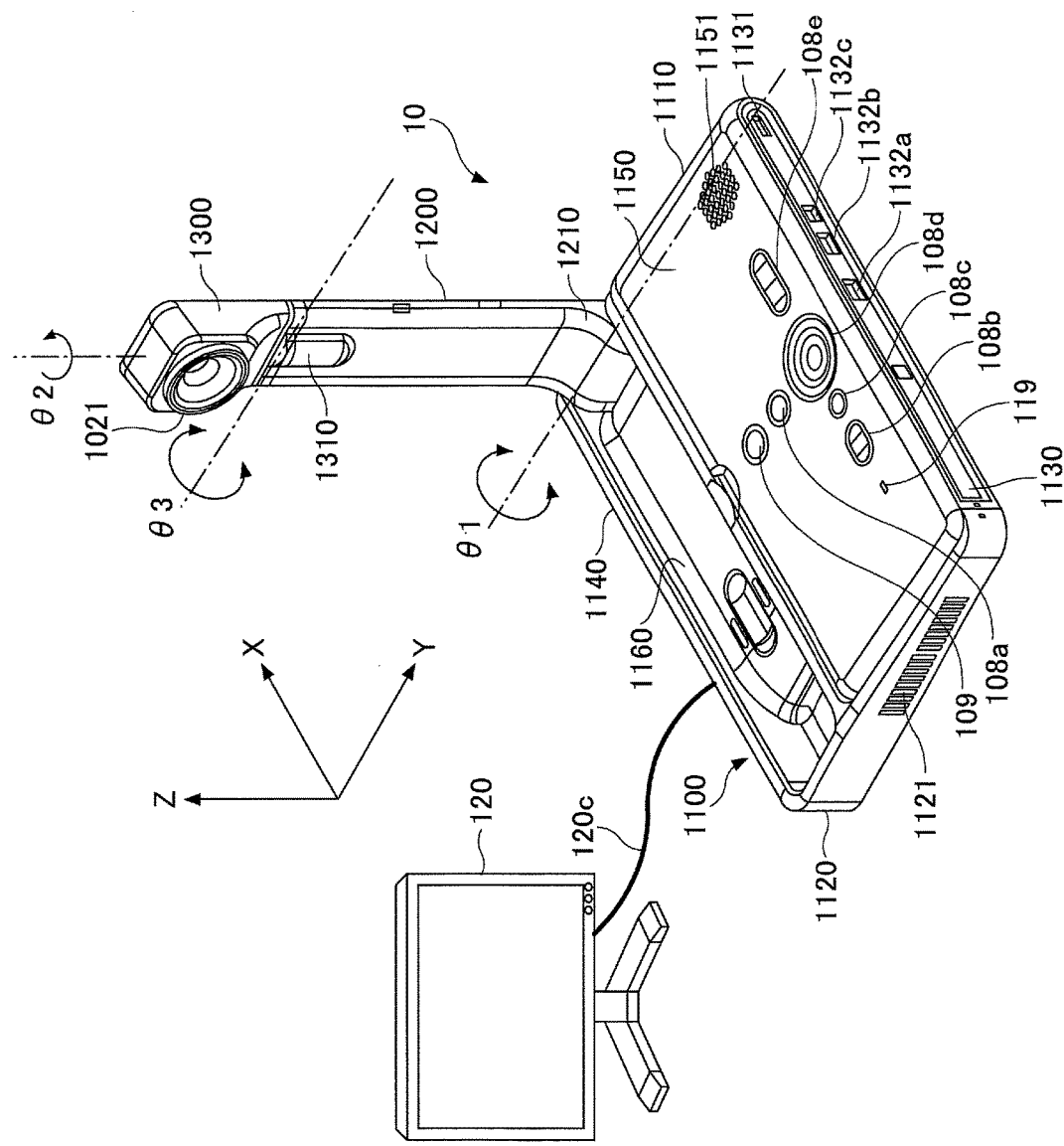
FIG. 4 is an example perspective view of the terminal.

In the following, a hardware configuration of the present embodiment will be described. FIG. 4 is an example perspective view of the terminal 10 of the present embodiment. As illustrated in FIG. 4, the terminal 10 includes a chassis 1100, an arm 1200, and a camera housing 1300. In front wall surface 1110 of the chassis 1100, a plurality of intake holes are formed in intake surface, while in rear wall surface 1120 of the chassis 1100, a plurality of exhaust holes are formed in exhaust surface 1121. Thus, ambient air can be taken in through the intake surface by driving a cooling fan included in the chassis 1100 to be evacuated through the exhaust surface 1121 to rear side of the terminal 10. A built-in microphone 114 (described below) can collect voice, sound, noise, etc., through a sound collection hole 1131 formed in right wall surface 1130 of the chassis 1100.

An operational panel 1150 is formed in right wall surface 1130 side of the chassis 1100. A plurality of operational buttons 108a-108e, a power source switch 109, and an alarm lamp 119 (described below) are formed in the operational panel, and also sound emission surface 1151 in which a plurality of sound emission holes are formed for outputting sound from a built-in speaker 115 (described below) is formed in the operational panel 1150. Further, a concave accommodating portion 1160 for accommodating the arm 1200 and the camera housing 1300 are formed in left wall surface 1140 side of the chassis 1100. A plurality of connection holes 1132a-1132c for electrically connecting cables with an external device's connection interface 118 (described below) are formed in right wall surface 1130 side of the chassis 1100. On the other hand, a connection hole for electrically connecting a cable 120c for a display 120 with the external device's connection interface 118 (described below) is formed in left wall surface 1140 of the chassis 1100.

Additionally, in the following, an arbitrary button among the operational buttons 108a-108e is expressed as "operational button 108" and an arbitrary connection hole among the connection holes 1132a-1132c is expressed as "connection hole 1132".

The arm 1200 is attached onto the chassis 1100 through a torque hinge 1210 where the arm 1200 is rotatable in a vertical direction within tilt angle θ1 of 135° with respect to the chassis 1100. In FIG. 4, the arm 1200 is illustrated with its tilt angle θ1 of 90°. A built-in camera 112 (described below) is included in the camera housing 1300, and images of a user, a document, a room, etc., can be captured with the built-in camera 112. Also, a torque hinge 1310 is formed in the camera housing 1300. The camera housing 1300 is attached onto the arm 1200 through the torque hinge 1310. The camera housing 1300 is rotatable in horizontal direction within pan angle θ2 of ±180° and rotatable in vertical direction within tilt angle θ3 of ±45° with respect to the arm 1200, where the tilt and pan angle of the camera housing 1300 is 0° in FIG. 4.

Additionally, an appearance of the terminal 10 illustrated in FIG. 4 is not a limiting example. For example, the terminal 10 may be a common PC, a smartphone, or a tablet terminal. Also, the built-in camera and/or the built-in microphone may be replaced with a camera and/or microphone connected to the terminal 10.

Additionally, respective appearances of the relay apparatus 30, the control apparatus 50, and the common management apparatus 60 are not different from an appearance of a general server (computer), therefore the descriptions thereof are omitted.

Figure 5:
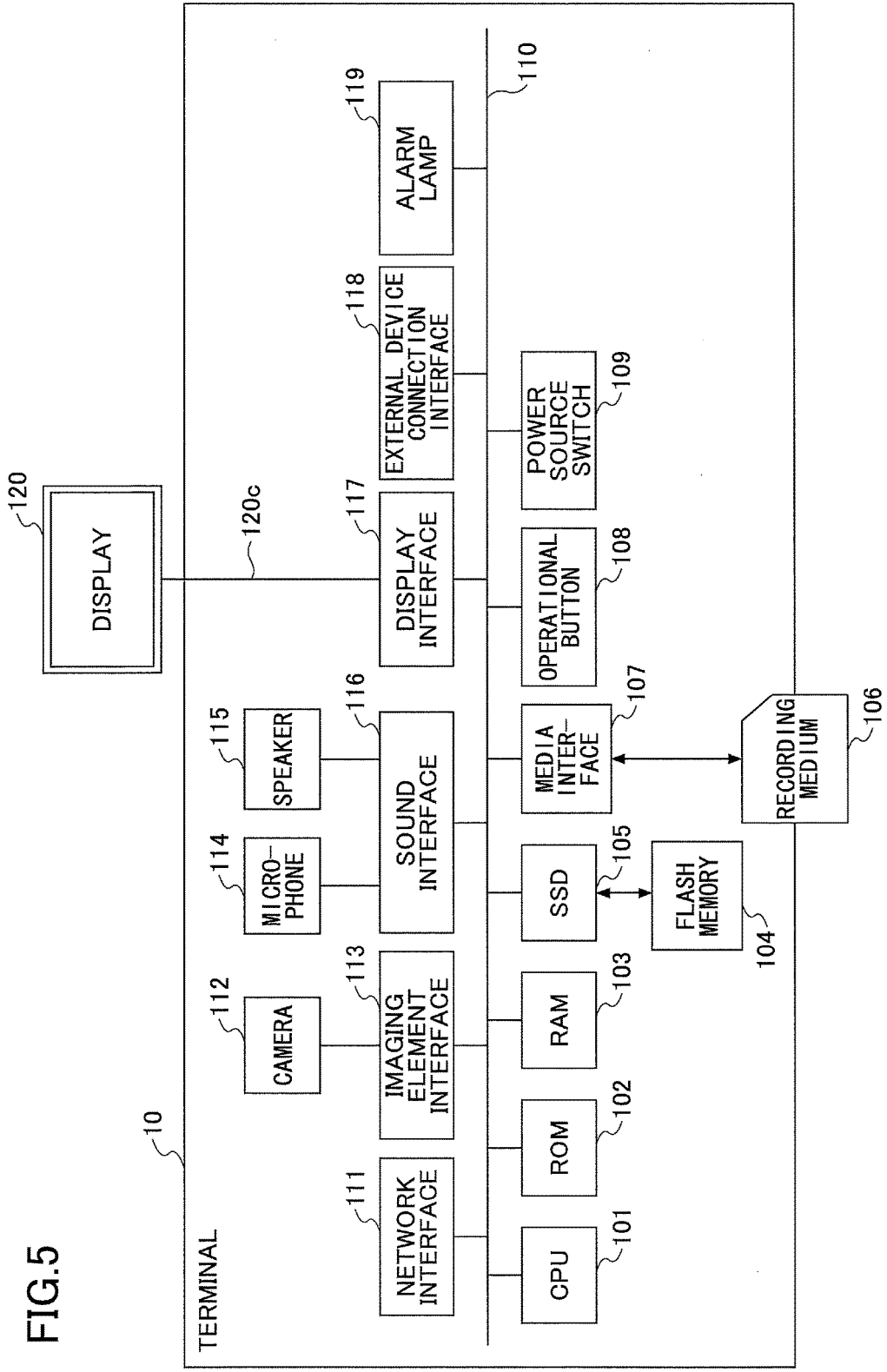
FIG. 5 is a block diagram illustrating a hardware configuration of the terminal.

FIG. 5 is a block diagram illustrating a hardware configuration of the terminal 10 of the present embodiment. As illustrated in FIG. 5, the terminal 10 includes a CPU (Central Processing Unit) 101 for controlling entire operation of the terminal 10, a ROM (Read Only Memory) 102 for storing a program for activating the CPU 101 such as IPL (Initial Program Loader), a RAM (Random Access Memory) 103 served as work area for the CPU 101, a flash memory 104 for storing data such as programs for the terminal 10, image data, or voice data, a SSD (Solid State Drive) 105 for controlling read/write of data from/in the flash memory 104 based on instructions of the CPU 101, a media interface 107 for controlling read/write of data from/in a recording medium 106 such as a flash memory or an IC (Integrated Circuit) card, an operational button 108 operated when selecting a destination terminal, etc., a power source switch 109 for turning on/off power of the terminal 10, and a network interface 111 for transmitting data through the communication network 2.

Also, the terminal 10 includes a camera 112 for capturing image of an object to acquire image data under control of the CPU 101, an imaging element interface 113 for controlling capturing image by the camera 112, a built-in microphone 114 for collecting sound, a built-in speaker 115 for outputting sound, a sound interface 116 for collecting and outputting sound by the built-in microphone 114 and the built-in speaker 115 under control of the CPU 101, a display interface 117 for transmitting image data to an external display 120 under control of the CPU 101, an external device connection interface 118 for connecting external devices, an alarm lamp 119 for informing abnormality in respective functions of the terminal 10, and a bus line 110 such as address bus or data bus for electrically connecting the respective elements as illustrated in FIG. 5.

The display 120 is a display unit for displaying images of an object, or images for inputting operations. A liquid crystal display or an Organic Electroluminescence display can be exemplified as the display 120. Also, the display 120 is connected to the display interface 117 by the cable 120c. The cable 120c may be a cable for analog RGB (VGA) signal, a cable for component video signal, a cable for HDMI (High-Definition Multimedia Interface), or a cable for DVI (Digital Video Interactive).

The camera 112 includes a lens, a solid state imaging element for converting light into electric charges to digitize the image of the object, where a CMOS (Complementary Metal Oxide Semiconductor), a CCD (Charge Coupled Device), etc., is used as the solid state imaging element.

An external camera, an external microphone, and an external speaker can be connected to the external device connection interface 118 by a USB (Universal Serial Bus) cable or the like inserted in the connection hole 1132 of the chassis 1100. In a case where the external camera is connected, the external camera is operated in priority to the built-in camera 112 under control of the CPU 101.

Similarly, in a case where the external microphone or the external speaker is connected, the external microphone or the external speaker is operated in priority to the built-in microphone 114 or the built-in speaker 115 under control of the CPU 101.

Additionally, the recording medium 106 is detachable to the terminal 10. Also, another nonvolatile memory in/from which data is written/read in accordance with the control of the CPU 101, such an EEPROM (Electrically Erasable and Programmable ROM) may be used instead of the flash memory 104.

Figure 6:
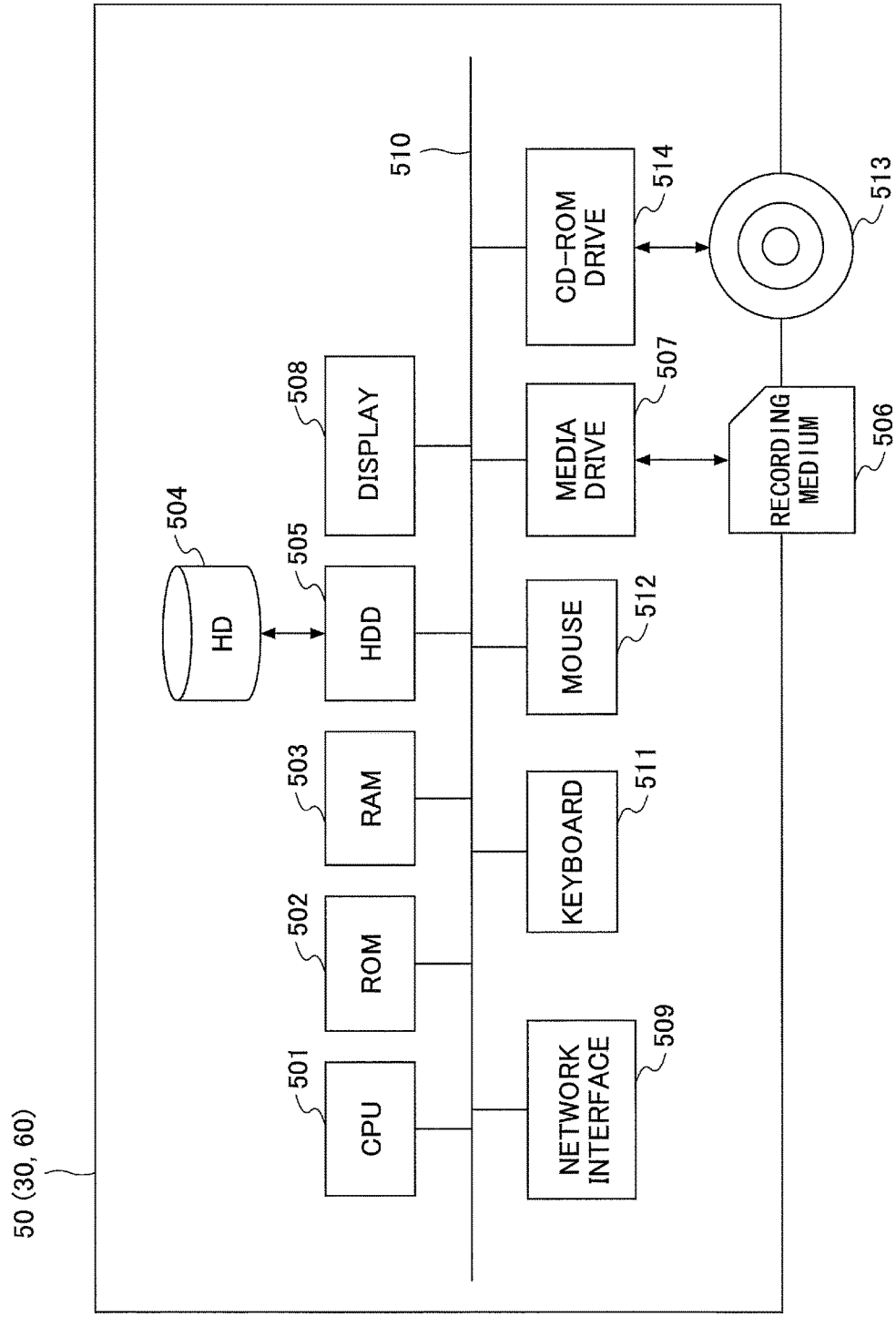
FIG. 6 is a block diagram illustrating a hardware configuration of a control apparatus.

FIG. 6 is a block diagram illustrating a hardware configuration of the control apparatus 50. The control apparatus 50 includes a CPU (Central Processing Unit) 501 for controlling entire operation of the control apparatus 50, a ROM 502 for storing a program for activating the CPU 501 such as IPL, a RAM 503 served as a work area for the CPU 501, a HD 504 for storing data such as programs for the control apparatus 50, a HDD (Hard Disk Drive) 505 for controlling read/write of data from/in the HD 504 based on instructions of the CPU 501, a media drive 507 for controlling read/write of data from/in a recording medium 506 such as a flash memory, a display 508 for displaying information such as a cursor, a menu, a window, characters, an image, etc., a network interface 509 for transmitting data through the communication network 2, a keyboard 511 including keys for inputting characters, numbers, instructions, etc., a mouse 512 for selecting or performing instructions, selecting an object to be processed and moving the cursor, a CD-ROM drive 514 for controlling read/write data from/in a CD-ROM (Compact Disc Read Only Memory) 513 which is an example of the detachable recording medium, and a bus line 510 such as address bus or data bus for electrically connecting the respective elements as illustrated in FIG. 6.

Since the relay apparatus 30 has a similar hardware configuration to that of the control apparatus 50, descriptions thereof are omitted.

Additionally, respective programs for the terminal 10, the relay apparatus 30, the control apparatus 50, and the common management apparatus 60 may be recorded in a computer readable recording medium in an installable or executable format so as to be distributed. A CD-R (Compact Disc Recordable), a DVD (Digital Versatile Disk), and a Blu-ray disc can be exemplified as the above described recording medium. Also, the recording media, such as a CD-ROM, for storing the respective programs and the HD 504 for storing these programs are used as program products in Japan or a foreign country.

Also, the control apparatus 50 and the common management apparatus 60 may be integrated in one computer or may be included in a plurality of computers separating their respective units (functions or means) to be arbitrarily disposed in the computers. Further, the common management apparatus 60 may be integrated in any one of a plurality of control apparatuses 50.

<General Arrangement of Communication System>

Figure 7:
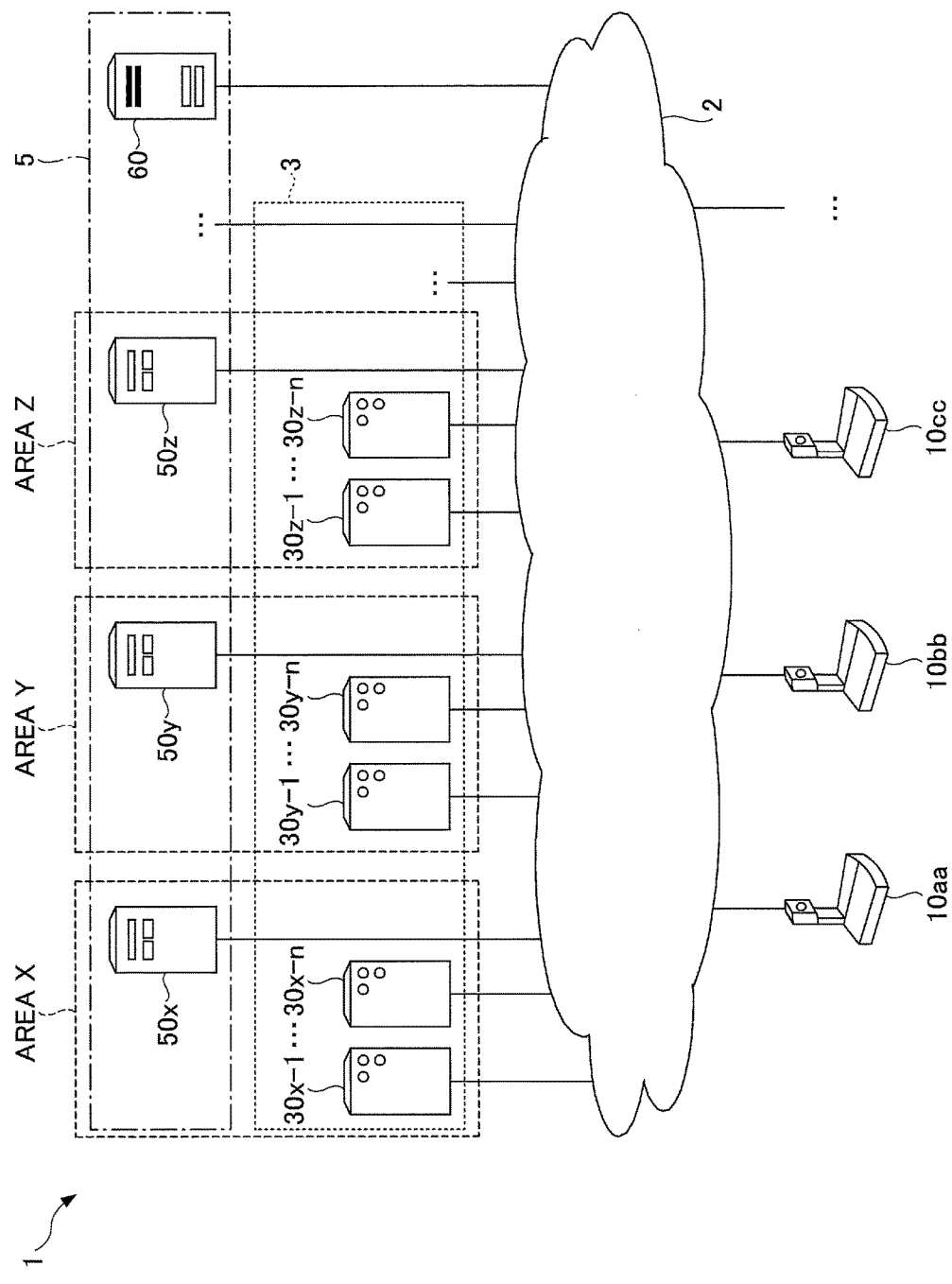
FIG. 7 is a diagram illustrating a general arrangement of the communication system.

In the following, a general arrangement of the communication system in the present embodiment will be described with reference to FIG. 7. FIG. 7 is a diagram illustrating a general arrangement of the communication system in the present embodiment.

The terminal 10, the relay apparatus 30, the control apparatus 50, and the common management apparatus 60 are connected to the communication network 2 so as to be able to communicate with each other. The communication network 2 may be a LAN (Local Area Network), the internet, mobile communication network, or dedicated lines.

For example, the dedicated lines, as a part of the communication network 2, may connect between the relay apparatuses 30, between the control apparatuses 50, or between the control apparatus 50 and the common management apparatus 60. However, this is not a limiting example. In this case, stable communication can be performed between the apparatuses. Also, wired communication and wireless communication may be included in the communication performed on the communication network 2.

The control apparatus 50x manages relay apparatuses 30x-1, 30x-2, . . . 30x-n located in the area X. For example, the area X is in Japan, where the relay apparatuses 30x-1, 30x-2, . . . 30x-n and the control apparatus 50x are disposed in a data center in Tokyo.

The control apparatus 50y manages relay apparatuses 30y-1, 30y-2, . . . 30y-n located in the area Y. For example, the area Y is in USA, where the relay apparatuses 30y-1, 30y-2, . . . 30y-n and the control apparatus 50y are disposed in a data center in New York.

The control apparatus 50z manages relay apparatuses 30z-1, 30z-2, . . . 30z-n located in the area Z. For example, the area Z is in south-eastern Asia, where the relay apparatuses 30z-1, 30z-2, . . . 30z-n and the control apparatus 50z are disposed in a data center in Singapore.

Respective terminals 10aa, 10bb, and 10cc are portable, and may be connected to the communication network 2 from areas X, Y, or Z, or may be connected to the communication network 2 from other areas.

In the communication system 1, four or more terminals 10 may be included. The common management apparatus 60 may be disposed in any one of the areas X, Y, and Z, or may be disposed in another area. Also, the relay apparatus 30 and the control apparatus 50 may be disposed in an area other than the areas X, Y, and Z.

Figure 8:
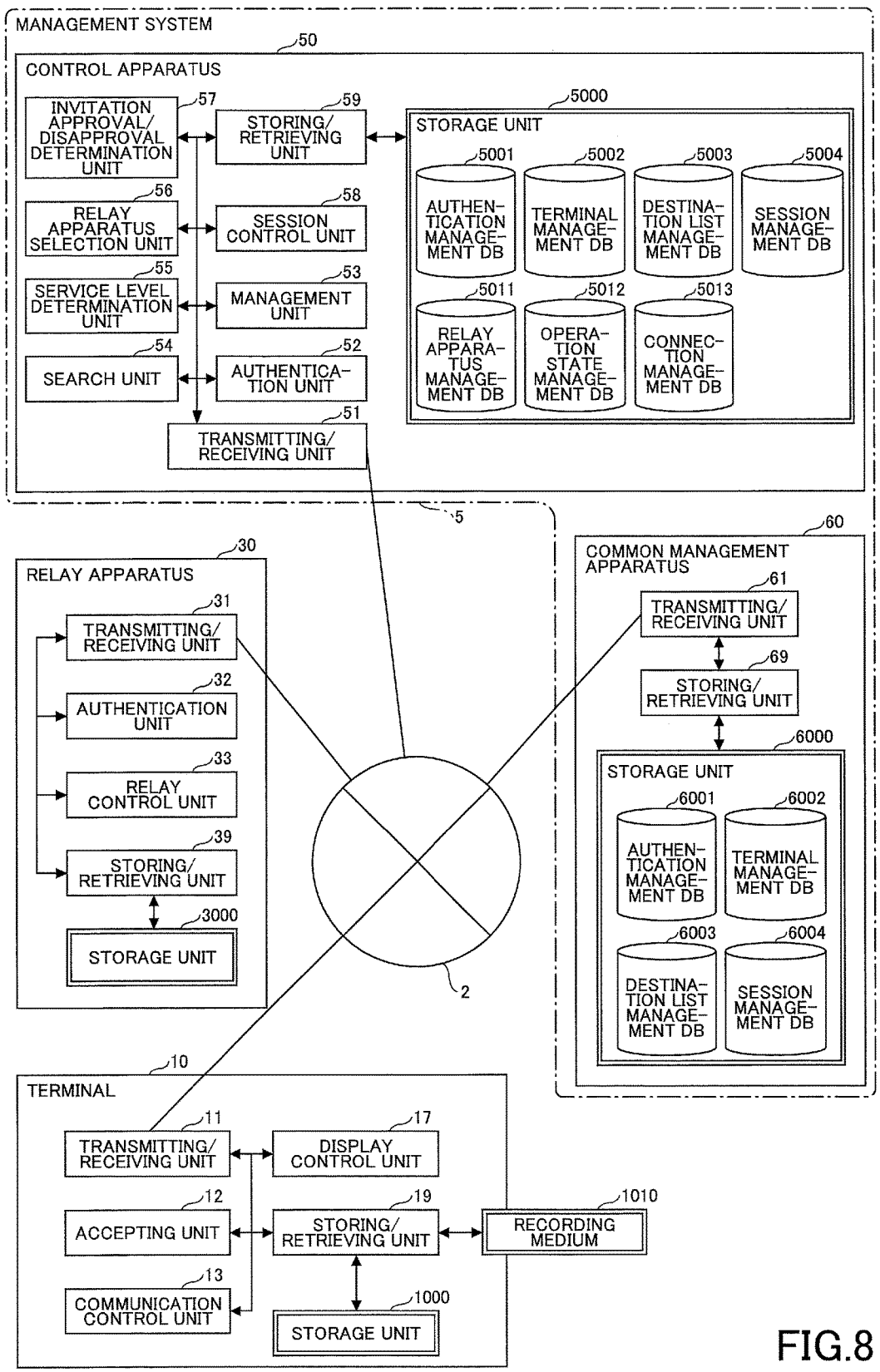
FIG. 8 is a diagram illustrating functional configuration of the terminal, a relay apparatus, a control apparatus, and a common management apparatus.

In the following, a functional configuration of the communication system 1 will be described with reference to FIG. 5, FIG. 6, and FIG. 8. FIG. 8 is a diagram illustrating the functional configuration of the communication system of the present embodiment.

<Functional Configuration of Terminal>

The terminal 10 includes a transmitting/receiving unit 11, an accepting unit 12, a communication control unit 13, a display control unit 17, and a storing/retrieving unit 19. The respective functional units are achieved by operating any of the elements illustrated in FIG. 5 based on instructions from the CPU 101 according to programs retrieved from the flash memory 104 and loaded into the RAM 103. Also, the terminal 10 includes a storage unit 1000 configured by the RAM 103 and the flash memory 104 illustrated in FIG. 5. Further, the terminal 10 includes a recording medium 1010 formed by the recording medium 106, from/into which data is retrieved/written by the storing/retrieving unit 19.

<Functional Units of Terminal>

In the following, respective functional units of the terminal 10 will be described. Additionally, in the following, relations with elements or units important to achieve the respective functional units of the terminal 10 illustrated in FIG. 5 are also described in order to explain the respective functional units of the terminal 10.

The transmitting/receiving unit 11 is achieved by instructions of the CPU 101 and the network interface 111, and transmits/receives data (or information) to/from the terminal of a counterpart, apparatus, system, etc., through the communication network 2.

The accepting unit 12 is achieved by the instructions of the CPU 101, the operational button 108, and the power source switch 109, and accepts respective input operations from a user. For example, when the user turns on the power source switch 109, the accepting unit 12 accepts power-on to turn on the power of the terminal 10.

The communication control unit 13 is achieved by instructions from the CPU 101, the camera 112, and the imaging element interface 113, and captures an image of an object to output image data of the captured image. Also, the communication control unit 13 is achieved by the instructions from the CPU 101 and the sound interface 116, and provides sound data of a sound signal, where voice of the user, etc., are converted into the sound signal by the microphone 114. Further, the communication control unit 13 is achieved by the instructions from the CPU 101 and the sound interface 116, and causes the speaker 115 to output sound of the sound signal therefrom.

The display control unit 17 is achieved by the instructions from the CPU 101 and display interface 117, and performs control for combining received image data having discrete resolutions to transmit the combined image data to the display 120. The display control unit 17 can cause the display 120 to display the information item received form the control apparatus 50 by transmitting the information item to the display 120.

The storing/retrieving unit 19 is achieved by the instructions of the CPU 101 and the SSD 105. The storing/retrieving unit 19 stores data in the storage unit 1000 or recording medium 1010 and retrieves data from the storage unit 1000 or recording medium 1010. In the storage unit 1000, a terminal ID (Identification) for identifying the terminal 10, a password for log-in, etc., are stored. Additionally, at least one of the terminal ID and the password may be stored in the recording medium 1010, and retrieved therefrom by the storing/retrieving unit 19. In this case, the recording medium 1010 is an IC card (Integrated circuit card) such as a SIM card (Subscriber Identity Module Card). The user of the terminal 10 can use the communication services provided from an administrator of the management system 5 by purchasing the recording medium 1010.

Further, in the storage unit 1000, the image data and sound data received in the communication with destination terminal are overwritten in response to every reception of the image data and sound data. An image of the image data before being overwritten is displayed in the display 120, and sound of the sound data before overwritten is output from the speaker 115.

Additionally, the terminal ID of the present embodiment means identification information including language, characters, marks, signs, etc., for identifying the terminal 10. Also, the terminal ID may be formed by combining at least two of the language, characters, marks, signs, and the like. Further, a user ID for identifying the user of the terminal 10 may be used instead of the terminal ID. In this case, the user ID is included in the terminal identification information as well as the terminal ID.

<Functional Units of Control Apparatus>

The control apparatus 50 includes a transmitting/receiving unit 51, an authentication unit 52, a management unit 53, a search unit 54, a session control unit 58, and a storing/retrieving unit 59. These functional units are achieved by operating any of the elements illustrated in FIG. 6 based on instructions from the CPU 501 according to the program for the control apparatus 50 retrieved from the HD 504 and loaded into the RAM 503. Also, the control apparatus 50 includes a storage unit 5000 achieved by the HD 504.

In the storage unit 5000 of the control apparatus 50, area IDs indicating the located areas X, Y, and Z of the own control apparatus 50 or other control apparatuses 50 are stored. For example, an area ID "jp01" indicating Japan where the control apparatus 50x is located, an area ID "us01" indicating USA where the control apparatus 50y is located, and an area ID "sg01" indicating Singapore where the control apparatus 50z is located are stored in the storage unit 5000.

Also, in the storage unit 5000, an authentication management DB 5001 including authentication management table, a terminal management DB 5002 including terminal management table, a destination list management DB 5003 including destination management list table, a session management DB 5004 including session management table, a relay apparatus management DB 5011 including relay apparatus management table, an operation state management DB 5012 including operation state management table, and a connection management DB 5013 including connection management table are stored.

<Authentication Management Table>

FIG. 9A is a diagram schematically illustrating the authentication management table. In the authentication management table, the terminal ID for identifying the terminal 10 and the password are associated with each other. Additionally, here, the terminal IDs of respective terminals 10aa, 10bb, and 10cc are "01aa@xx.com", "01bb@xx.com", and "01cc@xx.com". However, "@xx.com" is included in all of terminal IDs, therefore, "@xx.com" may be omitted.

<Terminal Management Table>

FIG. 9B is a diagram schematically illustrating the terminal management table. In the terminal management table, a destination name (e.g., terminal name), a state information item indicating the communication state of the terminal 10, an IP address of the terminal 10, an area ID of the control apparatus 50 to which the terminal 10 is connected, a contract type of the terminal 10, and a service level available for the terminal 10 are associated with respective terminal IDs. The service level is an index indicating transmission quality of the content data transmitted in the session between the communication terminals. Value of service level is indicated by a number 0 to 10, where the value 10 corresponds to the highest transmission quality. For example, in the terminal management table illustrated in FIG. 9B, the contract type corresponding to the terminal ID "01aa" is "premium", and the service level is "10". "Premium", "regular", and "trial" are examples of the contract type, where the higher service fee is required for "premium" than "regular" and "trial" so as to use the communication system with the highest service level.

<Destination List Management Table>

FIG. 9C is a diagram schematically illustrating the destination list management table. In the destination list management table, a terminal ID selectable by a request source terminal as a destination terminal (destination candidate) is associated with the request source terminal's terminal ID.

<Session Management Table>

FIG. 9D is a diagram schematically illustrating the session management table. In the session management table, terminal IDs of terminals 10 participating in a session "sed" and a service level of the session are associated with a session ID for identifying the session "sed". The service level of the session is calculated and defined for the session. Additionally, in the present embodiment, in a case where the content data is transmitted between terminals 10 via a plurality of relay apparatuses by using the session "sed", one relay apparatus 30 manages the entire relay operation of the content data. The relaying destination of other relay apparatuses are provided where the one relay apparatus 30 is set to be an origin. Therefore, domain information (e.g., "001xx") indicating a relay apparatus (e.g., relay apparatus 30xx) that is the origin of the session "sed" is included in the session ID.

<Relay Apparatus Management Table>

FIG. 9E is a diagram schematically illustrating the relay apparatus management table. In the relay apparatus management table, a URI (Uniform Resource Identifier) of the relay apparatus 30, an operation state, and a service level of the relay apparatus 30 are associated with the relay apparatus ID of the relay apparatus 30. As described above, the service level is an index indicating the transmission quality of transmission quality of the content data transmitted in the session between the communication terminals. For example, the service level is set in accordance with stability, such as operation availability, of the relay apparatus 30, bandwidth of the network to which the relay apparatus 30 is connected, and image processing capacity of the relay apparatus.

<Operation State Management Table>

FIG. 9F is a diagram schematically illustrating the operation state management table. In the operation state management table, the operation state (presence) of a terminal is associated with the terminal ID of the terminal 10.

<Connection Management Table>

FIG. 9G is a diagram schematically illustrating the connection management table. In the connection management table, a relay apparatus connection ID that is generated in response to the terminal 10 being connected to the relay apparatus 30, a password that is used for an authentication of the terminal 10 in order to connect the terminal 10 to the relay apparatus 30 are associated with the terminal ID of the terminal 10.

<Functional Units of Control Apparatus>

In the following, respective functional units of the control apparatus 50 will be described. Additionally, in the following, relations with elements or units important to achieve the respective functional units of the control apparatus 50 in FIG. 6 are also described in order to explain the respective functional units of the terminal 10.

The transmitting/receiving unit 51 is achieved by instructions of the CPU 501 and the network interface 509, and transmits/receives data (or information) to/from the terminals, apparatus, system, etc., through the communication network 2.

The authentication unit 52 is achieved by instructions from the CPU 501, and searches for the authentication management table (see FIG. 9A) with the terminal ID and password received by the transmitting/receiving unit 51 as search keys. The authentication unit 52 performs the authentication of the terminal 10 by determining whether the same combination of the terminal ID and password is stored in the authentication management table.

The management unit 53 is achieved by the instructions from the CPU 501, and manages respective tables by adding or deleting respective information items in the respective tables described above.

The search unit 54 is achieved by the instructions from the CPU 501, and searches for terminal 10 (node) connected to other control apparatuses 50.

The session control unit 58 is achieved by the instructions from the CPU 501, and controls the session "sed" for transmitting the content data between the terminals 10. A control for establishing the session "sed", a control for causing the terminal 10 to participate in the established session "sed", a control for terminating the session "sed", etc., are included in the above described control.

The storing/retrieving unit 59 achieved by the instructions of the CPU 501 and the HDD 505 or achieved by the instructions of the CPU 501. The storing/retrieving unit 59 stores data in the storage unit 5000 and retrieves data from the storage unit 5000.

<Functional Configuration of Common Management Apparatus>

The common management apparatus 60 includes a transmitting/receiving unit 61 and a storing/retrieving unit 69. These functional units are achieved by operating any of the elements illustrated in FIG. 6 based on instructions from the CPU 501 according to the program for the common management apparatus 60 retrieved from the HD 504 and loaded into the RAM 503. Also, the common management apparatus 60 includes a storage unit 6000 achieved by the HD 504. An authentication management DB 6001 including a authentication management table, a terminal management DB 6002 including terminal management table, a destination list management DB 6003 including destination management list table, and a session management DB 6004 including session management table are stored in the storage unit 6000. Additionally, the authentication management DB 6001, the terminal management DB 6002, the destination list management DB 6003, and the session management DB 6004 of the common management apparatus 60 are synchronized with the authentication management DB 5001, terminal management DB 5002, destination list management DB 5003, and session management DB 5004 of the control apparatus 50. Therefore, same information items are managed by respective DBs.

<Functional Units of Common Management Apparatus>

The transmitting/receiving unit 61 is achieved by instructions of the CPU 501 and the network interface 509, and transmits/receives data (or information) to/from the terminals, apparatus, system, etc., through the communication network 2. The storing/retrieving unit 69 is achieved by the instructions of the CPU 501 and the HDD 505. The storing/retrieving unit 69 stores data in the storage unit 6000 and retrieves data from the storage unit 6000.

<Functional Configuration of Relay Apparatus>

The relay apparatus 30 includes a transmitting/receiving unit 31, an authentication unit 32, a relay control unit 33, and a storing/retrieving unit 39. These functional units are achieved by operating any of the elements illustrated in FIG. 6 based on instructions from the CPU 501 according to the program for the relay apparatus 30 retrieved from the HD 504 and loaded into the RAM 503. Also, the relay apparatus 30 includes a storage unit 3000 achieved by the HD 504.

<Functional Units of Relay Apparatus>

The transmitting/receiving unit 31 is achieved by instructions of the CPU 501 and the network interface 509, and transmits/receives data (or information) to/from the terminals, apparatus, system, etc., through the communication network 2.

The authentication unit 32 is achieved by instructions from the CPU 501. The authentication unit 32 performs the authentication of the terminal 10 by determining whether the same combination of the terminal ID, the relay apparatus ID, and relay apparatus connection password is stored in the connection management table (see FIG. 9G).

The relay control unit 33 is achieved by the instructions from CPU 501. The relay control unit 33 detects an operation state of the relay apparatus 30. For example, "Online", "Offline", etc., are included in the operation states of the relay apparatus 30. Also, the relay control unit 33 performs a control for establishing a communication session between a plurality of terminals 10 in cooperation with the control apparatus 50.

The storing/retrieving unit 39 achieved by the instructions of the CPU 501 and the HDD 505, or achieved by the instructions from the CPU 501. The storing/retrieving unit 39 stores data in the storage unit 6000 and retrieves data from the storage unit 6000.

<Process or Operation>

In the following, processes or operations of the terminal 10, the relay apparatus 30, the control apparatus 50, and the common management apparatus 60 included in the communication system 1 are described in detail.

<Log-In Process>

Figure 10:
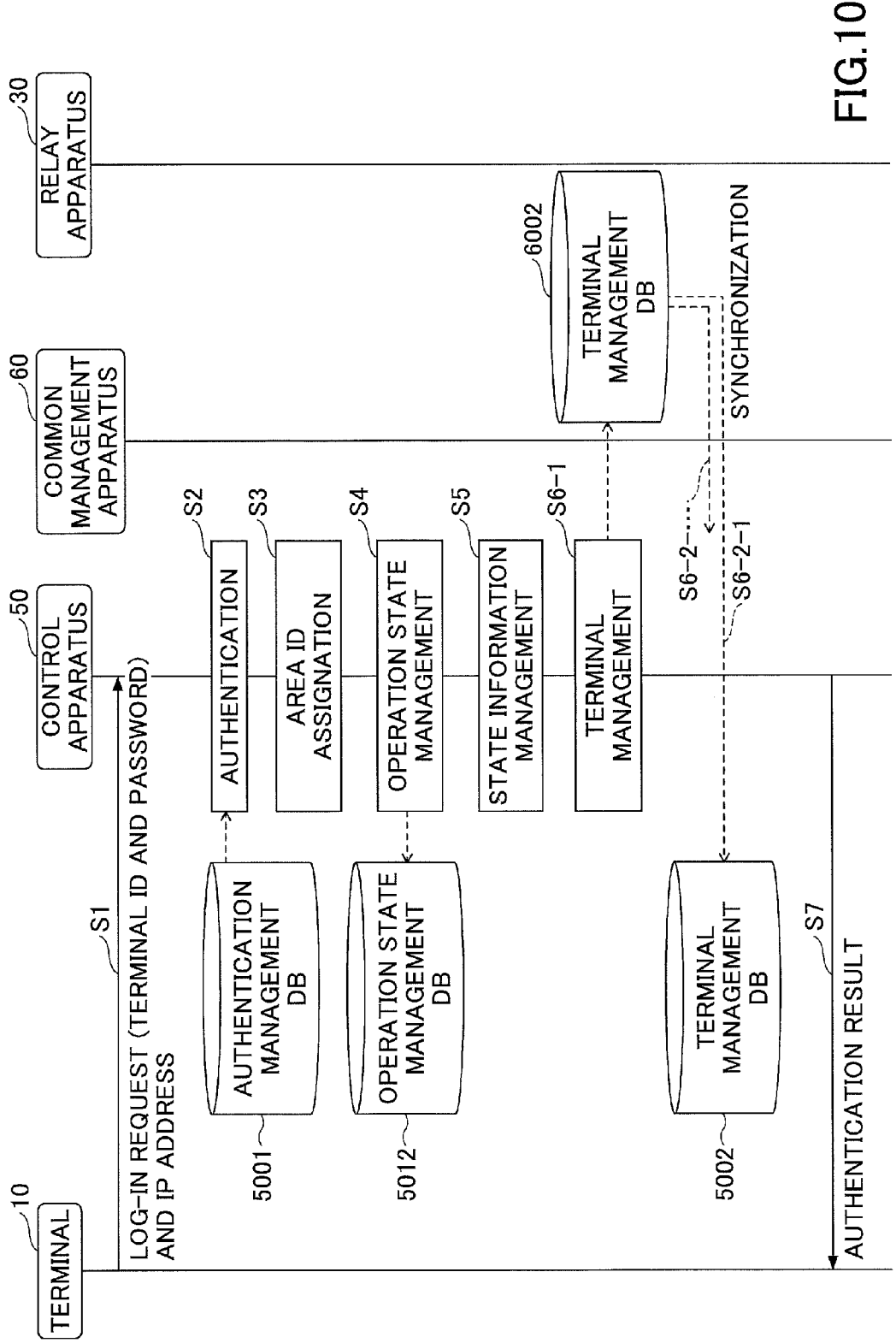
FIG. 10 is a sequence diagram illustrating a log-in process of the terminal 10.

First, a log-in process of the terminal 10 with respect to the control apparatus 50 and relay apparatus 30 is described with reference to FIG. 10. FIG. 10 is a sequence diagram illustrating the log-in process of the terminal 10.

In the present embodiment, the terminal 10 can log in any one of the plurality of control apparatuses 50. A method for selecting the control apparatus 50 to which a log-in request of the terminal 10 is transmitted may be arbitrarily chosen. A method for selecting the control apparatus 50 based on information input in the terminal 10, a method for selecting the nearest control apparatus 50 based on a position information of the terminal 10, a method for selecting the control apparatus 50 based on GSLB (Global Server Load Balancing), etc., may be chosen.

The terminal 10 transmits the log-in request and the IP address of the own terminal to the selected control apparatus 50 by using the transmitting/receiving unit 11 (step S1). The terminal ID and password of the request source terminal are included in the log-in request. Also, the IP address of the terminal 10 is transmitted with the login-request upon the log-in request being transmitted to the control apparatus 50. Thus, the transmitting/receiving unit 51 of the control apparatus 50 receives the log-in request including the terminal ID and password and the IP address of the terminal 10.

The authentication unit 52 authenticates the request source (source of log-in request) terminal 10 with reference to the authentication management table (FIG. 9A) (step S2). Here, in a case where the same combination of the terminal ID and password as a combination of the terminal ID and password transmitted from the request source terminal is recorded in the authentication management table, the request source terminal is successfully authenticated. On the other hand, in a case where the same combination of the terminal ID and password as a combination of the terminal ID and password transmitted from the request source terminal is not recorded in the authentication management table, the authentication of the request source terminal is resulted in failure.

The management unit 53 assigns the area ID indicating the area in which the own control apparatus 50 is located to the request source terminal 10 (step S3). The area ID to be assigned is stored in the storage unit 5000 of the control apparatus 50 in advance. For example, in a case where the control apparatus that receives the log-in request is the control apparatus 50x located in the area X (Japan), the management unit 53 assigns "jp01" as the area ID to the request source terminal 10.

The storing/retrieving unit 59 records the operation state "Online" associated with the terminal ID of the request source terminal 10 in the operation state management table (FIG. 9F) based on a request from the management unit 53 (step S4).

Also, the management unit 53 manages the communication state of the request source terminal 10 according to the state transition rule illustrated in FIG. 2 (step S5). That is, in response to the operation state changing into "Online" in step S4, the management unit 53 determines a new communication state of the request source terminal 10 to be "None" (FIG. 2).

The transmitting/receiving unit 51 of the control apparatus 50 transmits a request for updating the terminal management table (update request) to the common management apparatus 60 (step S6-1). The terminal ID and the IP address of the request source terminal, the area ID assigned in step S3, and the operation state determined in step S5 are included in the update request. In response to the transmitting/receiving unit 61 of the common management apparatus 60 receiving the update request, the storing/retrieving unit 69 records the terminal ID, the IP address, the operation state, and the area ID associated with each other in the terminal management table (FIG. 9B) of the common management apparatus 60.

Then, the transmitting/receiving unit 61 of the common management apparatus 60 transmits the updated content of the terminal management table including the terminal ID, the operation state, and the area ID to the respective control apparatuses 50x, 50y, and 50z included in the communication system 1. In the respective control apparatuses 50x, 50y, and 50z, in response to the transmitting/receiving unit 51 receiving the updated content, the storing/retrieving unit 59 updates the terminal management table of the own control apparatus 50 based on the received update content. Thus, the terminal management tables of the respective control apparatuses 50x, 50y, and 50z are synchronized with the terminal management table of the common management apparatus 60 (steps S6-2-1, S6-2- . . . ).

The transmitting/receiving unit 51 of the control apparatus 50 transmits the authentication result indicating a successful authentication to the request source terminal 10 (step S7).

In the following, descriptions are given in a case of successful authentication.

<Destination List Request>

Figure 11:
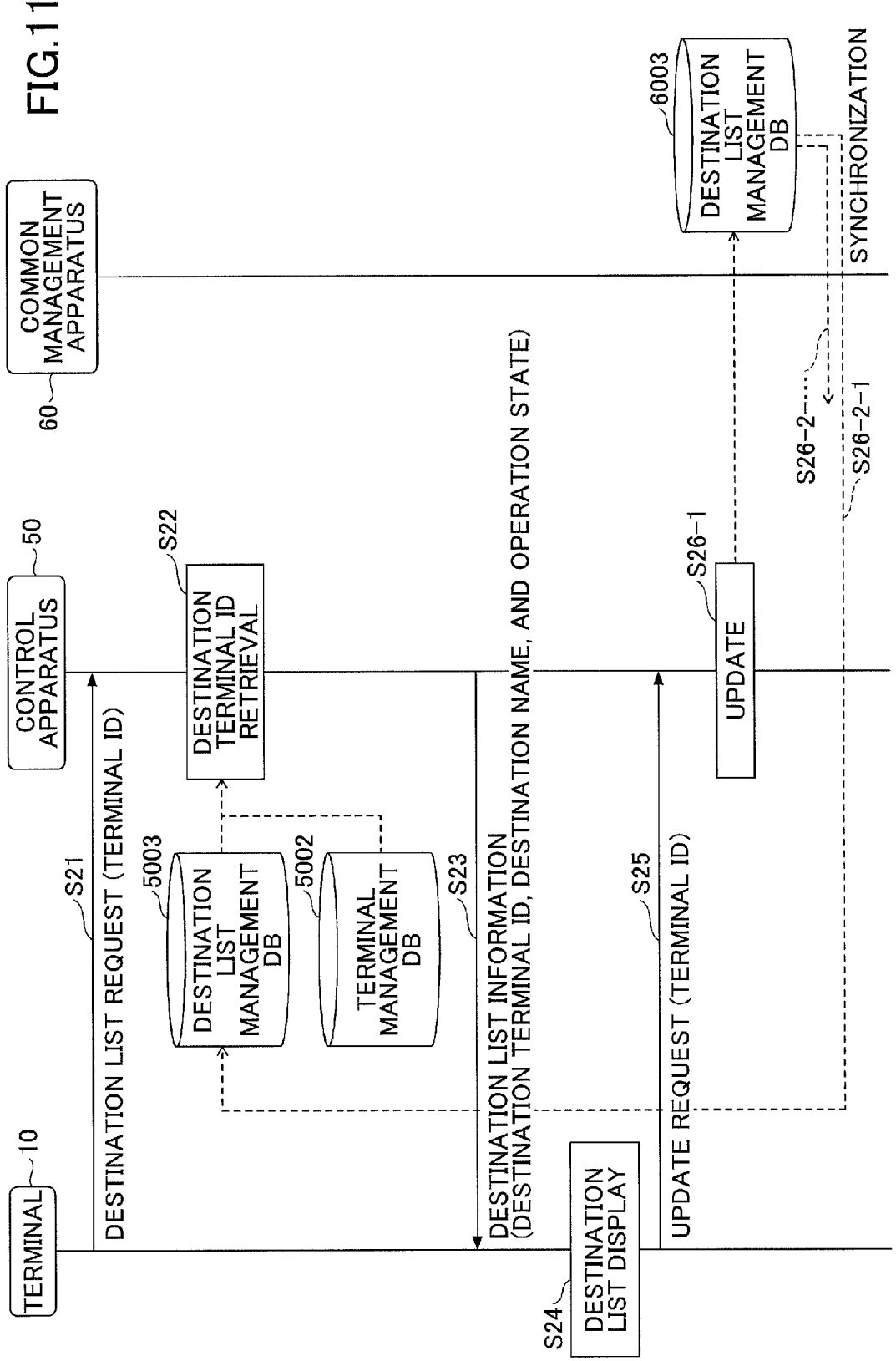
FIG. 11 is a sequence diagram illustrating a process for displaying a destination list in the terminal.

In the following, a process of the terminal 10 for displaying a destination list in which destination candidates with respect to the own terminal are shown will be described with reference to FIG. 11. FIG. 11 is a sequence diagram illustrating the process for displaying a destination list in the terminal. In the terminal 10, in response to receiving the authentication result, the transmitting/receiving unit 11 transmits a destination list request to the control apparatus 50 through the communication network 2, where the destination list request indicates the request for transmitting the destination request and the destination list request includes the terminal ID of the own terminal (step S21). Accordingly, the transmitting/receiving unit 51 of the control apparatus 50 receives the destination list request.

The storing/retrieving unit 59 searches for the destination list management table (FIG. 9C) with the terminal ID of the request source (source of destination list request) terminal 10 as the search key, thereby extracting terminal IDs of the destination candidates that are selectable as the destination terminal by the request source terminal (step S22). Also, the storing/retrieving unit 59 searches for the terminal management table (FIG. 9B) with the extracted terminal IDs as the search keys, thereby retrieving destination names. The transmitting/receiving unit 51 of the control apparatus 50 transmits the terminal IDs and destination names of the destination candidates retrieved by the storing/retrieving unit 59 to the request source terminal 10 (step S23).

In response to the transmitting/receiving unit 11 of the request source terminal 10 receiving the destination list information, the display control unit 17 of the terminal 10 displays the destination list indicating destination names of selectable destination candidates in the display 120 (see FIG. 3) based on the terminal IDs and the destination names included in the destination list information (step S24).

According to the present embodiment, in a case where a destination candidate is added into or deleted from the destination list, the terminal 10 transmits an update request of the destination list management table to the control apparatus 50, where the terminal ID of the destination candidate to be added/deleted and the terminal ID of the own terminal are included in the update request (step S25). In response to receiving the update request, the transmitting/receiving unit 51 transmits the update request of the destination list management table to the common management apparatus 60 based on a request from the management unit 53 (step S26-1). The terminal ID of the request source (source of update request) terminal and the terminal ID of the destination candidate to be added/deleted are included in the update request transmitted in step S26-1. The storing/retrieving unit 69 of the common management apparatus 60 adds the terminal ID of the destination candidate to be added associated with the terminal ID of the request source terminal to the destination list management table. Or, the storing/retrieving unit 69 of the common management apparatus 60 deletes the terminal ID of the destination candidate to be deleted, which is associated with the terminal ID of the request source terminal, from the destination list management table.

The transmitting/receiving unit 61 of the common management apparatus 60 transmits the updated content of the destination list management table to the respective control apparatuses 50x, 50y, and 50z included in the communication system 1. In the respective control apparatuses 50x, 50y, and 50z, in response to the transmitting/receiving unit 51 receiving the updated content, the storing/retrieving unit 59 updates the destination list management table of the own control apparatus 50 based on the received updated content. Thus, the destination management tables of respective control apparatuses 50x, 50y, and 50z are synchronized with the destination list management table of the common management apparatus (steps S26-2, . . . ).

<Operation State Management>

Figure 12:
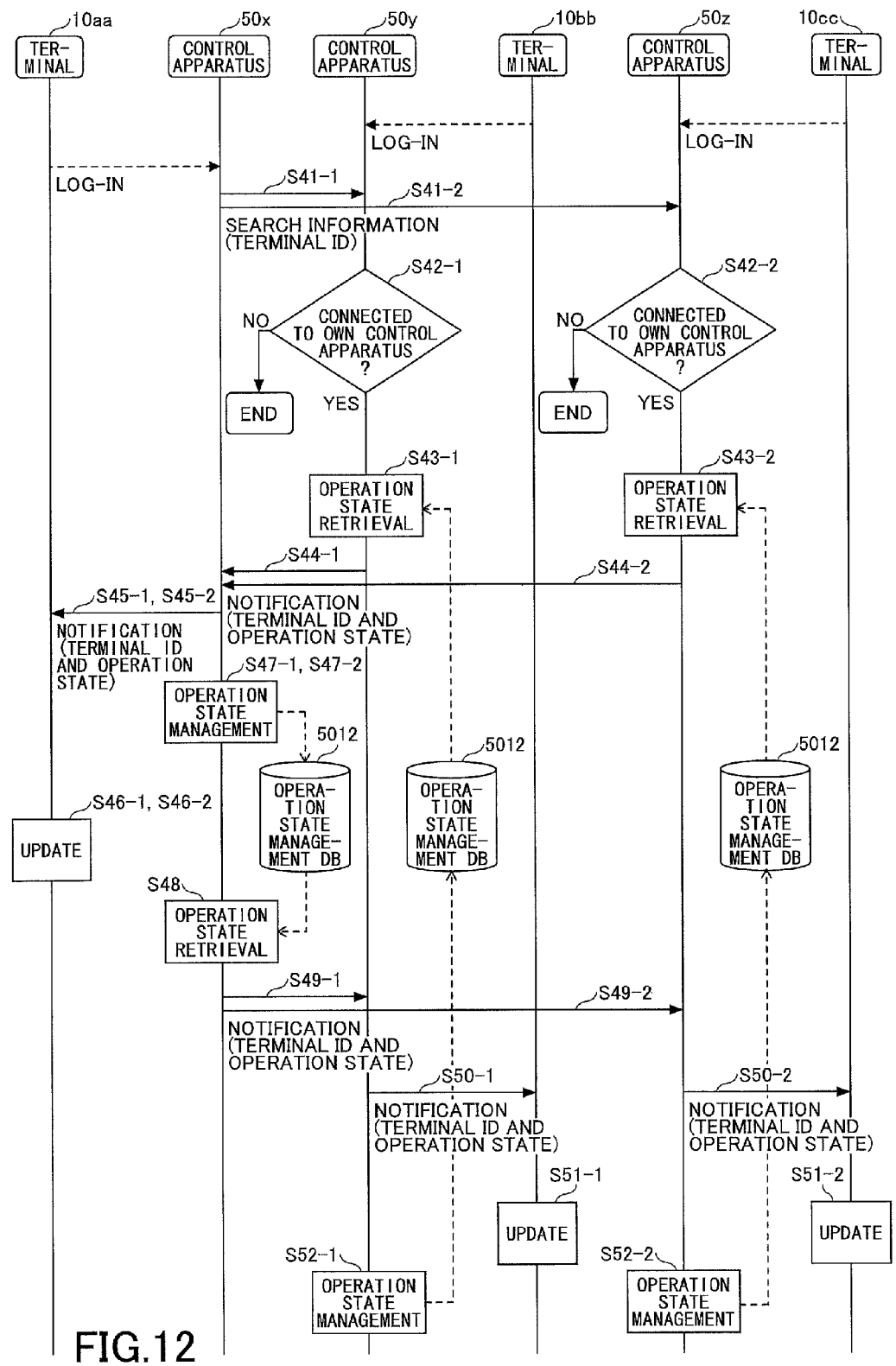
FIG. 12 is a sequence diagram illustrating a process for synchronizing operation state of the terminal between respective control apparatuses.

In the following, a process for synchronizing the operation state of the terminal 10 managed by the respective control apparatuses 50x, 50y, and 50z included in the management system 5 will be described with reference to FIG. 12, where the process will be described as an example inter-node cooperative process. FIG. 12 is a sequence diagram illustrating the process for synchronizing the operation state of the terminal between respective control apparatuses 50.

When the terminal 10 (e.g., terminal 10aa) logs in the control apparatus 50 (e.g., control apparatus 50x), the search unit 54 of the control apparatus 50 searches for the destination candidates (e.g., terminals 10bb and 10cc) as the nodes (step S41-1 and S41-2). The node search is performed so as to recognize which control apparatus 50 the destination candidates are connected to, where the destination candidates are terminals 10 that are not connected to the own control apparatus 50. Therefore, the node search is performed with respect to terminals 10 that are not connected to the own control apparatus 50 among the destination candidates.

In a case where the node search is performed, the transmitting/receiving unit 51 of the control apparatus 50x transmits search information for the node search to other control apparatus 50y and 50z based on a request from the search unit 54. The terminal ID of the terminal 10aa that is connected to the own control apparatus and the terminal IDs of the destination candidate terminals 10bb and 10cc that are not connected to the own control apparatus are included in the search information.

In response to the transmitting/receiving units 51 of the control apparatus 50y and 50z receiving the search information, the session control units 58 of the control apparatuses 50y and 50z respectively determine whether terminals 10bb and 10cc identified by the terminal IDs included in the search information are connected to the own control apparatus 50 (steps S42-1 and S42-2). A known method for determining the connection with the terminal 10 may be used. For example, the connection with the terminal 10 may be determined based on a determination whether a predetermined time passes from a timing of the last reception of a certain information item, where the certain information item is periodically transmitted from the terminal 10 through the session "sei". In a case where it is determined that the terminals (10bb and 10cc) identified by the terminal IDs are not connected to the own control apparatus (NO in steps S42-1 and S42-2), the control apparatus 50 terminates the process without responding to the request source control apparatus 50x. In the following, descriptions are given in a case where it is determined that the terminals (10bb and 10cc) identified by the terminal IDs are connected to the own control apparatus (YES in steps S42-1 and S42-2).

The storing/retrieving units 59 of the control apparatuses 50y and 50z respectively retrieve the operation state corresponding to the terminal 10bb or 10cc from the operation state management table (FIG. 9F), where terminal 10bb or 10cc is connected to the own control apparatus 50y or 50z among the destination candidate terminals included in the search request (step S43-1 and S43-2).

The transmitting/receiving units 51 of the control apparatuses 50y and 50z transmits a notification, as a response to the search information, to the control apparatus 50x, where the terminal ID of the terminal that is connected to the own control apparatus 50y or 50z and the operation state retrieved in step S43-1 or 43-2 are included in the notification (steps S44-1 and S44-2). In response to the transmitting/receiving unit 51 of the control apparatus 50x receiving the respective notifications, the search unit 54 recognizes that the terminal 10bb or 10cc identified by the terminal ID included in the notification is connected to the control apparatus 50 that has transmitted the notification. The transmitting/receiving unit 51 transmits the received notifications to the terminal 10aa that has logged in the control apparatus 50x (steps S45-1 and S45-2). In response to the transmitting/receiving unit 11 of the terminal 10aa receiving the notifications, the display control unit 17 updates icons indicating the operation states of the respective destination candidate terminals 10bb and 10cc in the destination list (see FIG. 3) based on the terminal IDs of destination candidate terminals 10bb and 10cc and the operation states thereof included in the notifications (steps S46-1 and S46-2).

On the other hand, in the control apparatus 50x, the storing/retrieving unit 59 records, based on a request from the management unit 53, the operation states included in the notifications transmitted form the control apparatuses 50y and 50z associated with terminal IDs of respective terminals 10bb and 10cc (steps S47-1 and S47-2) in the operation state management table of the own control apparatus. Thus, the control apparatus 50x can recognize the operation states of the destination candidate terminals 10bb and 10cc, where the destination candidates can be selected as the destination of the terminal 10aa that is connected to the own control apparatus.

Also, the storing/retrieving unit 59 of the control apparatus 50x retrieves the operation state corresponding to the terminal 10aa connected to the own control apparatus from the operation state management table (step S48). The transmitting/receiving unit 51 of the control apparatus 50x transmits a notification including the terminal ID of the terminal 10aa and the operation state retrieved in step S48 to the control apparatuses 50y and 50z, where the destination candidate terminals 10bb and 10cc are respectively connected to the control apparatuses 50y and 50z (steps S49-1 and S49-2). In response to the transmitting/receiving units 51 of the control apparatuses 50y and 50z respectively receiving the notification, the transmitting/receiving units 51 respectively transmit the notification to the terminals 10bb and 10cc, where terminal 10bb or 10cc is connected to the own control apparatuses 50y or 50z (steps S50-1 and S50-2). In response to the transmitting/receiving unit 11 of the terminals 10bb and 10cc receiving the notification, the display control unit 17 updates icons indicating the operation states of the terminal 10aa in the destination list based on the terminal ID of terminal 10aa and the operation states thereof included in the notification (steps S51-1 and S51-2).

Also, in the control apparatuses 50y and 50z, the storing/retrieving unit 59 updates, based on a request from the management unit 53, the operation state of the terminal 10aa in the operation state management table of the own control apparatus according to the notification transmitted from the control apparatus 50x (steps S52-1 and S52-2). Thus, the control apparatus 50y and 50z can recognize the operation state of the terminal 10aa that is connected to the control apparatus 50x.

Additionally, respective control apparatuses and respective terminals perform steps S43-1 to S47-1, steps S43-2 to S47-2, and step S48 and steps S52-1 and S52-2 at every timing when the operation state of the terminal 10 that is connected to the own control apparatus is updated. Therefore, the control apparatus 50, the terminal 10, and the user of the terminal can recognize the latest operation state of the terminals 10.

<Establishing Session sed>

Figure 13:
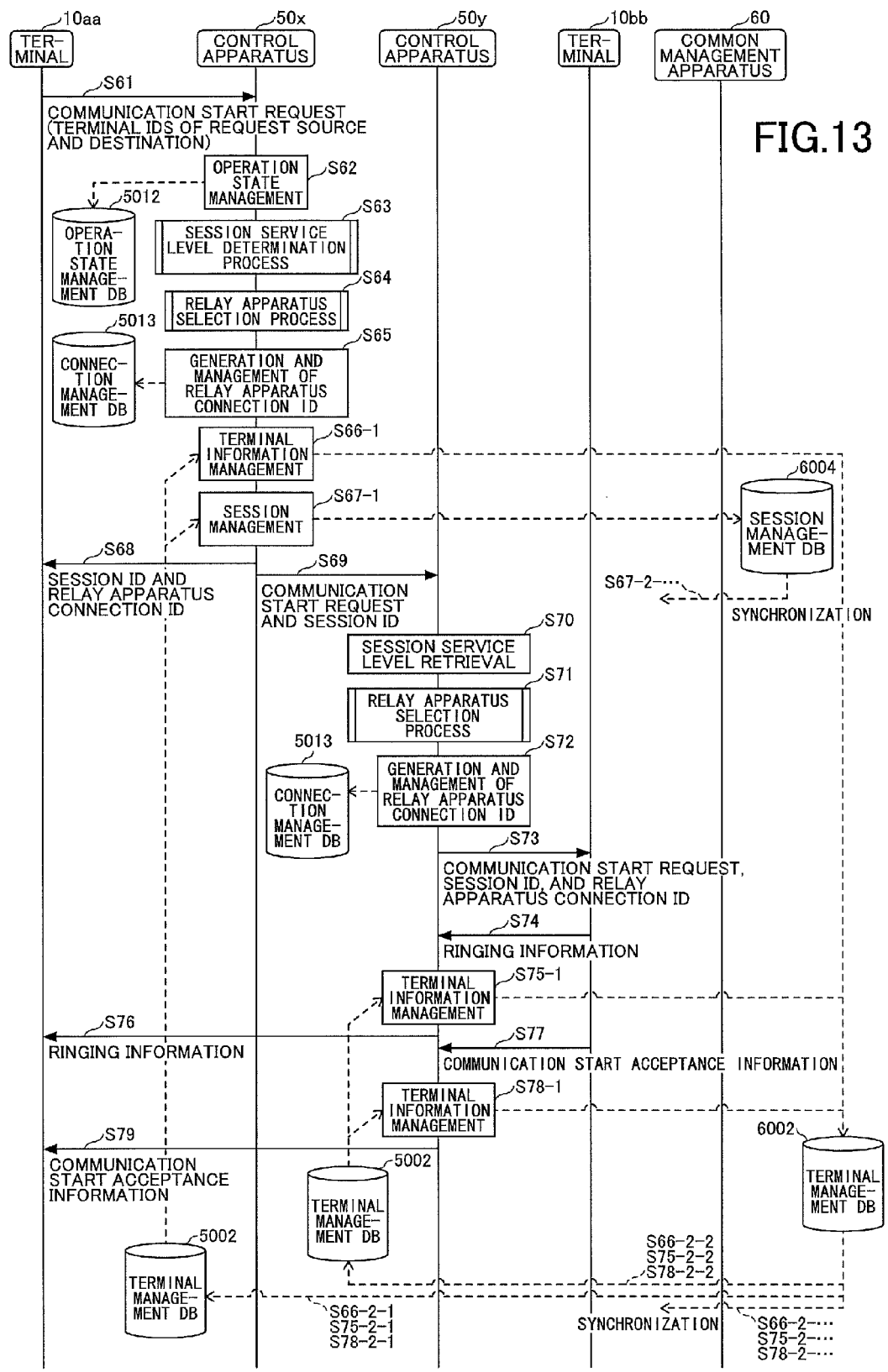
FIG. 13 is a sequence diagram illustrating a process for transmitting information items between the terminals.

In the following, a process for transmitting information items between the terminals 10 in order to establish the session "sed" will be described with reference to FIG. 13. Additionally, FIG. 13 is a sequence diagram illustrating the process for transmitting the information items between the terminals 10. In the following, descriptions are given in case where the terminal 10aa connecting to the control apparatus 50x transmits a communication start request, where the terminal 10bb connected to the 50y is selected as a destination of the communication.

In response to user's operation of the operational button 108, the terminal 10aa transmits a communication start request to the control apparatus 50x through the transmitting/receiving unit 11 (step S61). The terminal ID "01aa" of the request source (source of communication start request) terminal 10aa and the terminal ID "01bb" of the destination terminal 10bb are included in the communication start request.

In response to the transmitting/receiving unit 51 of the control apparatus 50x receiving the communication start request, the storing/retrieving unit 59 records, based on a request from the management unit 53, an operation state "Online (Busy)" associated with the terminal ID of the request source terminal 10aa in the operation state management table (FIG. 9F) (step S62). The record (update) of operation state "Online (Busy)" is transmitted to destination candidate terminals 10 of the terminal 10aa in steps S48 to step S52-2 described above.

A service level determination unit 55 determines a service level of the session based on service level available for the terminal 10aa and terminal 10bb that will participate in the session (step S63).

Figure 14B:
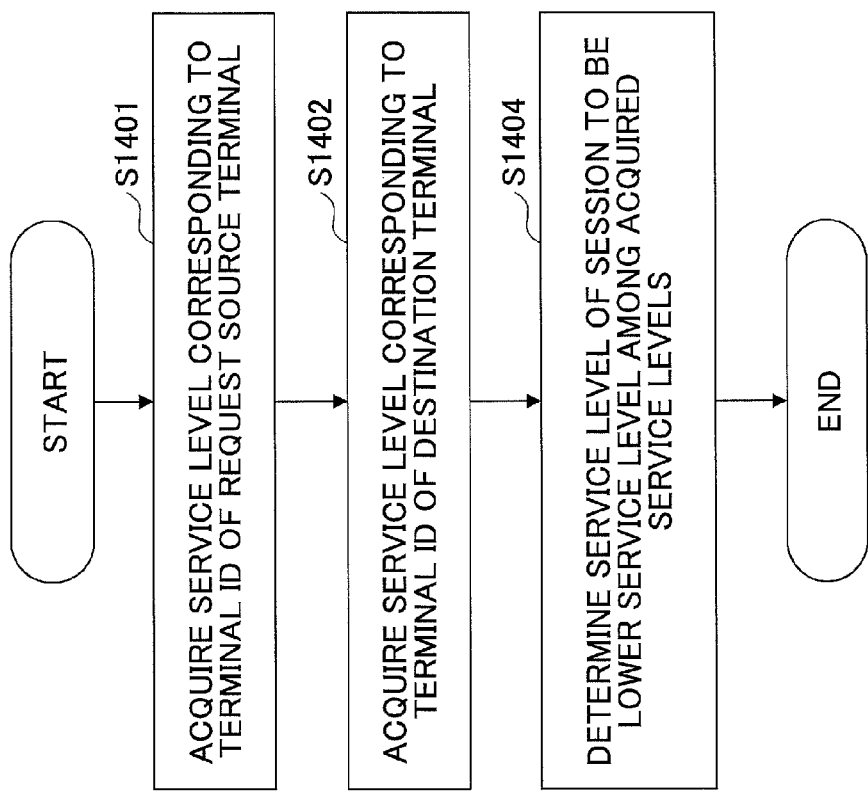
FIG. 14B is a flowchart illustrating another example session service level determination process.
Figure 14A:
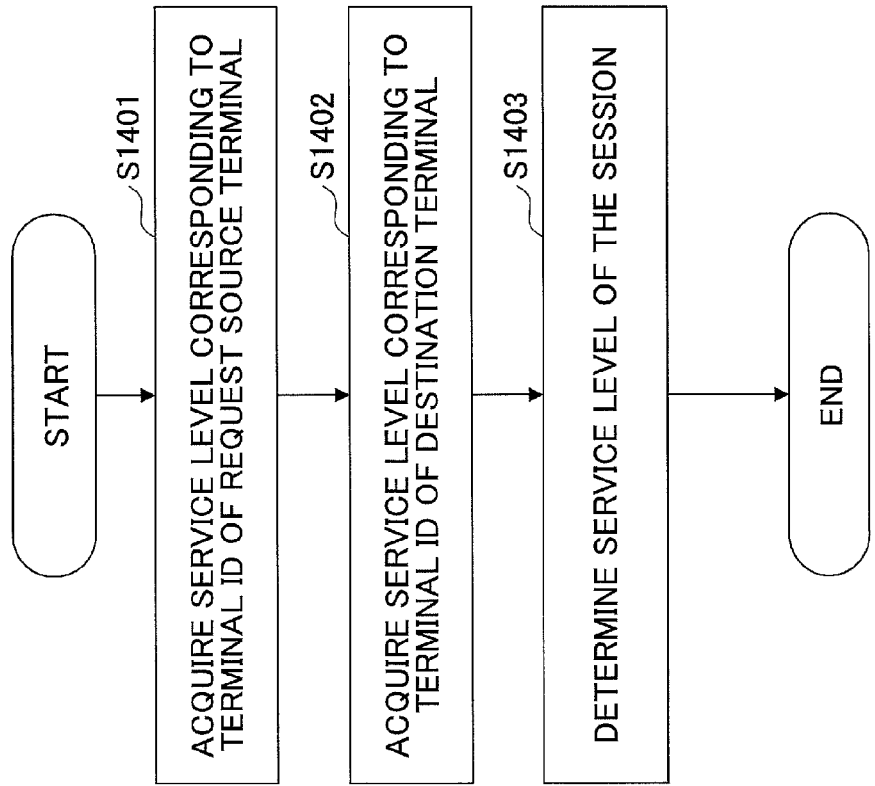
FIG. 14A is a flowchart illustrating an example session service level determination process.

FIG. 14A and FIG. 14B are flowcharts illustrating example session service level determination processes. Additionally, the process corresponds to the session service level determination process depicted as step S63 in FIG. 13.

In step S1401 in FIG. 14A, the service level determination unit 55 acquires a value of service level corresponding to the terminal ID of the request source terminal from the terminal management table illustrated in FIG. 9B. For example, the service level determination unit 55 acquires value "10" of the service level corresponding to the terminal ID "01aa" of the request source terminal 10aa.

In step S1402 in FIG. 14A, the service level determination unit 55 acquires a value of service level corresponding to the terminal ID of the destination terminal from the terminal management table illustrated in FIG. 9B. For example, the service level determination unit 55 acquires value "8" corresponding to the terminal ID "01bb" of the termination terminal 10bb.

Additionally, processing sequence of steps S1401 and S1402 may inverted, and the values of service level corresponding to the terminal IDs of the request source terminal and the destination terminal may be collectively acquired.

In step S1403 in FIG. 14A, the service level determination unit 55 determines the service level of the session based on the acquired values of the service level corresponding to the terminal IDs of the request source terminal and the destination terminal.

For example, in a case where the acquired value of service level corresponding to the request source terminal is the same as the acquired value of service level corresponding to the destination terminal, the service level determination unit 55 determines the service level of the session to be the acquired value.

On the other hand, in a case where the acquired value of service level corresponding to the request source terminal is different from the acquired value of service level corresponding to the destination terminal, the service level of the session may be determined to be lower value, determined to be higher value, determined to be an average of the acquired values, determined to be the acquired value corresponding to the request source terminal, or the like.

Here, as a non-limiting example, the service level of the session is determined to be lower value in a case where the acquired value of service level corresponding to the request source terminal is different from the acquired value of service level corresponding to the destination terminal. In this case, the process is performed as illustrated in FIG. 14B.

In FIG. 14B, processes of step S1401 and S1402 are similar to those in FIG. 14A.

In step S1404 in FIG. 14B, the service level determination unit 55 determines the service level of the session to be lower value among the values acquired in steps S1401 and S1402. For example, in a case where the value of service level corresponding to the terminal ID "01aa" of the terminal 10aa is "10" and the value of service level corresponding to the terminal ID "01bb" of the terminal 10bb is "8", the service level determination unit 55 determines the service level of the session to be "8".

Additionally, in a case where the acquired value of service level corresponding to the request source terminal is the same as the acquired value of service level corresponding to the destination terminal, the service level determination unit 55 determines the service level of the session to be the acquired value common to both request source terminal and destination terminal.

Referring back to FIG. 13, description of the sequence diagram is continued.

In steps S64, a relay apparatus selection unit 56 of the control apparatus 50 selects one relay apparatus 30 from relay apparatuses 30 located in own area based on the service level determined by the service level determination unit 55.

Figure 15A:
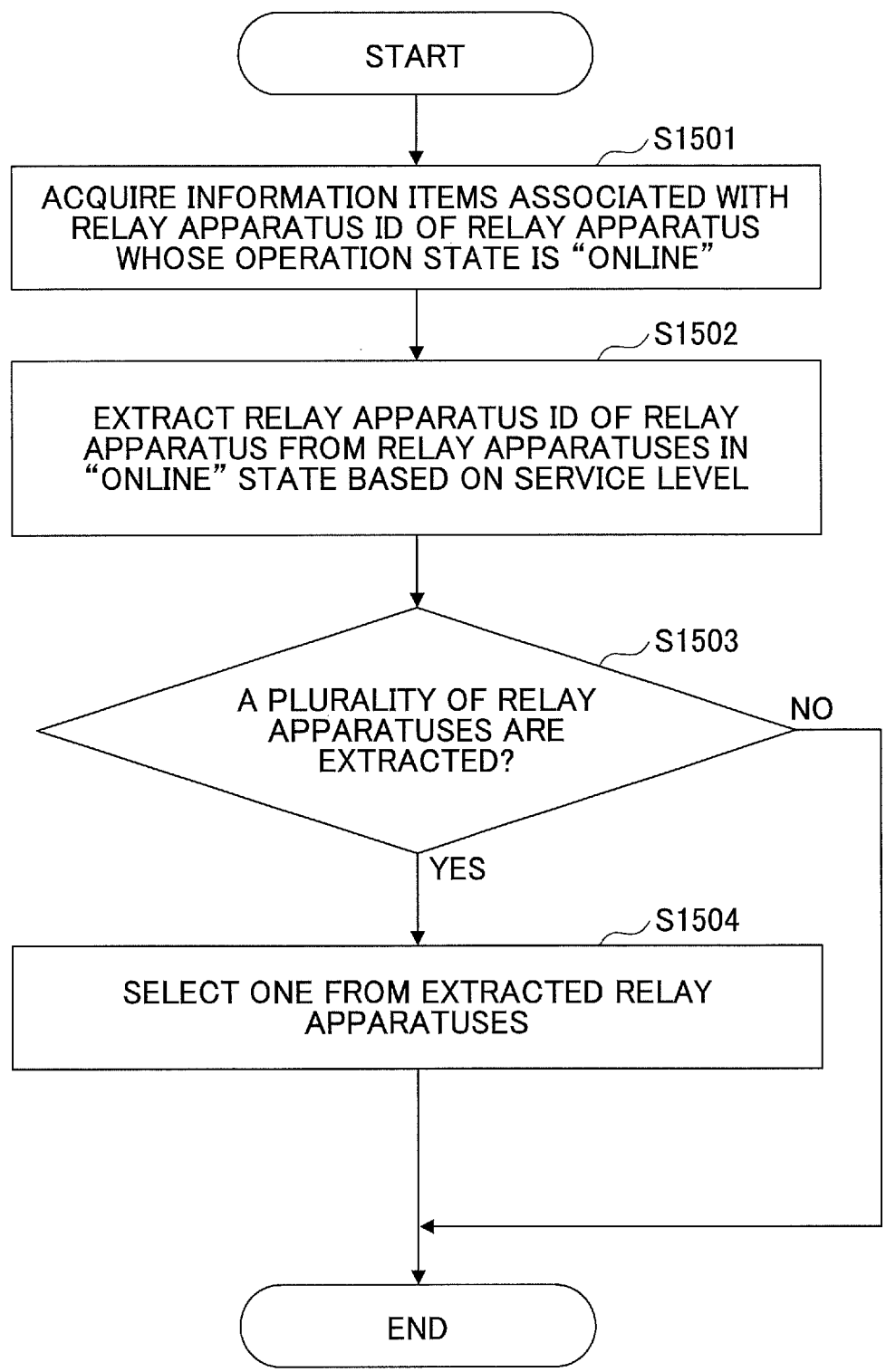
FIG. 15A is a flowchart illustrating an example relay apparatus selection process.
Figure 15B:
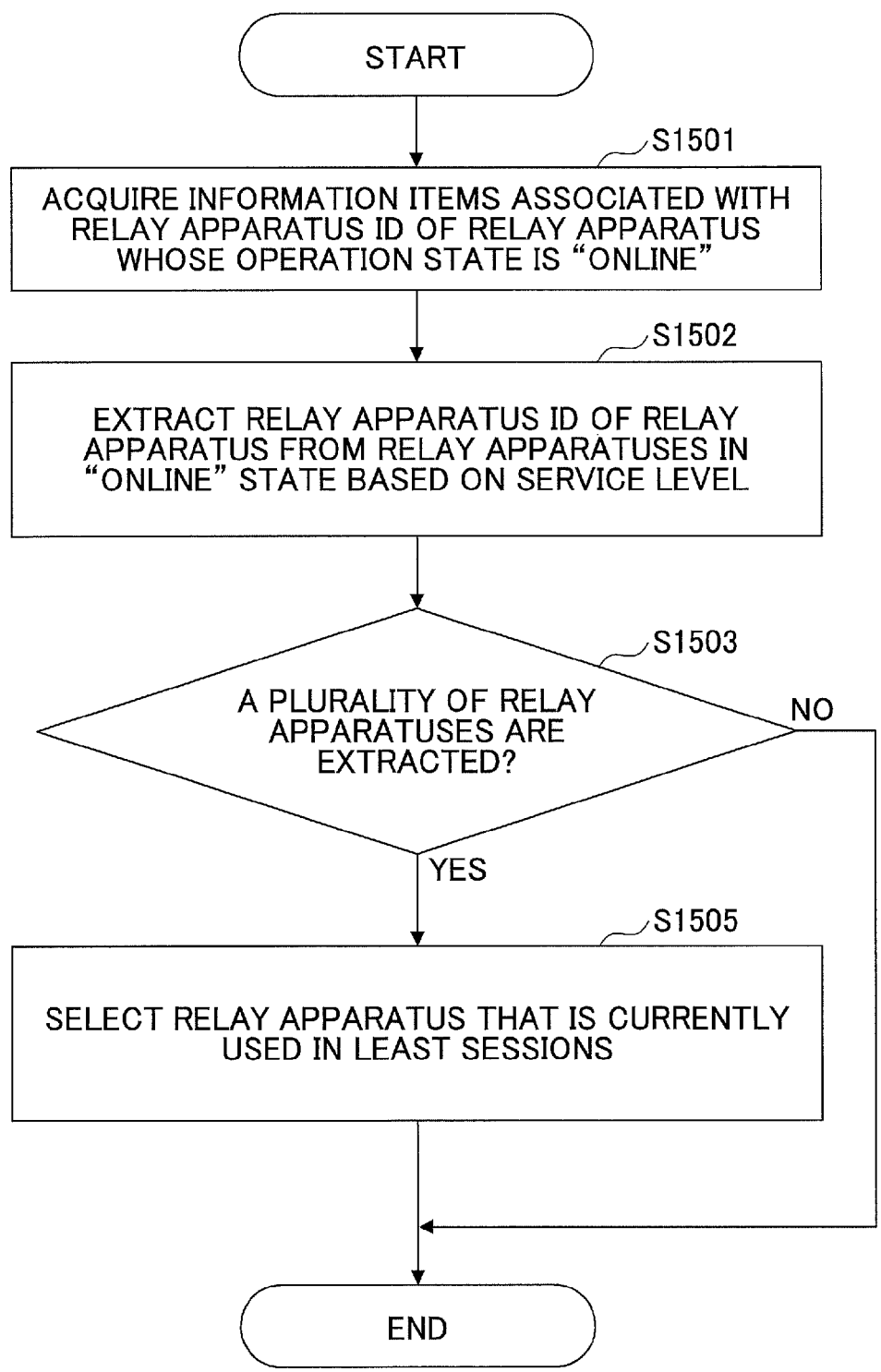
FIG. 15B is flowchart illustrating another example relay apparatus selection process.

FIG. 15A and FIG. 15B are flowcharts illustrating example relay apparatus selection processes. Additionally, the relay apparatus selection process corresponds to the relay apparatus selection process performed in step S64 of FIG. 13.

In step S1501 in FIG. 15A, the relay apparatus selection unit 56 acquires information items associated with the relay apparatus ID of the relay apparatus 30 whose operation state is "Online" from the relay apparatus management table managed by the own control apparatus. For example, relay apparatus IDs "001xx", "002xx", and "003xx" which are respectively associated with the operation state "Online", are acquired from the relay apparatus management table illustrated in FIG. 9E In step S1502 in FIG. 15A, the relay apparatus selection unit 56 extracts the relay apparatus ID of the relay apparatus 30 from relay apparatuses 30 indicated by the information items acquired in step S1501, where service level of the extracted relay apparatus is equal to or less than the service level of the session determined by the service level determination unit 55 and highest among the relay apparatuses of the acquired information items. Thus, a relay apparatus 30 having the highest service level is extracted from the relay apparatuses 30 that can be used for the session.

In step S1503, the relay apparatus selection unit 56 determines whether a plurality of relay apparatuses 30 are extracted in step S1502.

In a case where a plurality of relay apparatuses 30 are not extracted in step S1502, the relay apparatus selection unit 56 terminates the relay apparatus selection process. For example, in a case where single relay apparatuses 30 is extracted in step S1502, the extracted relay apparatus 30 is determined to be the relay apparatus 30 used in the session. Also, in a case where no relay apparatus 30 is extracted in step S1502, for example, the control apparatus 50 determines that no relay apparatus is available for the session, thereby terminating the session. In the following, descriptions are given in a case where at least one relay apparatus 30 is extracted in step S1502.

On the other hand, in a case where a plurality of relay apparatuses 30 are extracted in step S1502, the process is forwarded to step S1504.

In step S1504, the relay apparatus selection unit 56 selects one relay apparatus 30 from the extracted relay apparatuses 30.

A method for selecting a relay apparatus 30 from the extracted relay apparatuses 30 may be arbitrarily chosen. For example, a relay apparatus 30 being used in least sessions (of lowest utilization rate) may be selected among relay apparatuses 30 respectively used in sessions, or a relay apparatus 30 may be randomly selected. Or, the relay apparatus selection unit 56 may select the relay apparatus 30 physically nearest to the terminals 10aa and 10bb that participate in the session, where the distance between the terminals 10*aa* and 10*bb* and the relay apparatus 30 is determined based on the IP addresses of the terminals 10*aa* and 10*bb*, and the like. In this case, for example, the relay apparatus selection unit 56 can estimate locations of terminals 10 and the relay apparatus 30 with reference to Geo-location database released on a network.

In the following, as a non-limiting example, the relay apparatus selection unit 56 selects a relay apparatus 30 based on number of sessions that use the relay apparatus 30, where the selected relay apparatus 30 is currently used in least sessions among the relay apparatuses 30 respectively used in sessions. In this case, the process is performed as illustrated in FIG. 15B.

In FIG. 15B, processes of steps S1501 to S1503 are similar to those in FIG. 15A.

In step S1505 of FIG. 15B, the relay apparatus selection unit 56 selects a relay apparatus 30 based on number of sessions that use the relay apparatus 30, where the selected relay apparatus 30 is currently used in least sessions among the relay apparatuses 30, extracted in step S1502, respectively used in sessions. For example, the relay apparatus selection unit 56 can calculate the number of sessions using the relay apparatus 30 based on the terminal management table illustrated in FIG. 9B and session management table illustrated in FIG. 9D.

Additionally, in the session "sed" established between terminals 10*aa* and 10*bb*, two relay apparatuses 30 perform relay operation of the content data. Among the two relay apparatuses 30, the relay apparatus 30 selected in step S64 manages entire relay destinations in the session between nodes (terminal 10 or relay apparatus 30). That is, the selected relay apparatus 30 serves as an origin that provides information items indicating relay destination of the content data, etc., to the other relay apparatus 30.

Referring back to FIG. 13, description of the sequence diagram is further continued. In the following, the relay apparatus selected in step S64 among the relay apparatuses 30*x*-1, 30*x*-2, ... 30*x*-*n* managed by the control apparatus 50*x* is referred to as relay apparatus 30*xx*.

The session control unit 58 of the control apparatus 50*x* generates and manages a relay apparatus connection ID used for the request source terminal 10*aa* to connect to the relay apparatus 30*xx* (step S65). Also, in step S65, the storing/retrieving unit 59 searches for the relay apparatus management table (FIG. 9E) with the relay apparatus ID of the selected relay apparatus 30*xx* as a search key, thereby retrieving corresponding URI. Also, the storing/retrieving unit 59 records the generated relay apparatus connection ID and relay apparatus connection password associated with the terminal ID of the request source terminal 10*aa* in the connection management table (FIG. 9G). Additionally, the relay apparatus connection password may be predetermined on a relay apparatus 30-by-relay apparatus 30 basis, or may be generated at every timing when the terminal 10 connects to the relay apparatus 30.

The management unit 53 manages the communication state of the terminal 10 in accordance with the state transition rule illustrated in FIG. 2 (step S66-1). That is, the management unit 53 determines "Inviting" to be a new state of the terminal 10*aa*, while the management unit 53 determines "Invited" to be a new state of the terminal 10*bb*. Then, the management unit 53 transmits an update request of the terminal management table to the common management apparatus 60, where the update request requires that the relay apparatus ID determined in step S64 and the state information "Inviting" are recorded to be associated with the terminal ID of the request source terminal 10*aa*, and that the state information "Invited" is recorded to be associated with the terminal ID of the destination terminal 10*bb*.

In response to the transmitting/receiving unit 61 of the common management apparatus 60 receiving the update request, the storing/retrieving unit 69 records the relay apparatus ID and the state information associated with the terminal ID included in the update request in the terminal management table (FIG. 9B) of the common management apparatus 60. Then, by performing processes similar to steps S6-2-1, S6-2-2, etc., the terminal management tables of respective control apparatuses 50*x*, 50*y*, and 50*z* are synchronized with the terminal management table of the common management apparatus 60 (steps S66-2-1, S66-2-... ).

Subsequently, the management unit 53 manages information items related to the session "sed" established between the terminals 10*aa* and 10*bb* (step S67-1). The management unit 53 generates a session ID for identifying the session "sed" established between the terminals 10*aa* and 10*bb*. In this case, the management unit 53 generates a session ID (e.g., conf01.001*xx*) including the relay apparatus ID (e.g., "001*xx*") of the relay apparatus 30*xx* selected in step S64. The transmitting/receiving unit 61 of the common management apparatus 60 transmits an update request of the session management table (FIG. 9D) to the common management apparatus 60 based on a request from the management unit 53, where the update request includes the generated session ID, service level determined in step S63, and the terminal IDs of request source terminal 10*aa* and the destination terminal 10*bb*.

In response to the transmitting/receiving unit 61 receiving the update request, the storing/retrieving unit 69 records the session ID, the service level of the session, and the terminal ID included in the update request in the session management table of the common management apparatus 60 so as to be associated with each other. Then, the transmitting/receiving unit 61 transmits the updated content of the session management table to the respective control apparatuses 50*x*, 50*y*, and 50*z* included in the communication system 1. In response to the transmitting/receiving units 51 of the respective control apparatuses 50*x*, 50*y*, and 50*z* receiving the updated content, the storing/retrieving units 59 of the control apparatuses 50*x*, 50*y*, and 50*z* respectively update the session management table of own control apparatus. Therefore, the terminal management tables of the respective control apparatuses 50*x*, 50*y*, and 50*z* are synchronized with the session management table of the common management apparatus 60 (steps S67-2- ... ).

Also, the transmitting/receiving unit 51 of the control apparatus 50*x* transmits the URI of the relay apparatus 30 managed in step S65, the relay apparatus connection ID and relay apparatus connection password, and the session ID generated in step S67-1 to the request source terminal 10*aa* (step S68). Further, the transmitting/receiving unit 51 of the control apparatus 50*x* transmits the communication start request transmitted from the request source terminal 10*aa* and the session ID to the control apparatus 50*y* associated with the area ID corresponding to the destination terminal 10*bb* (step S69).

In response to the transmitting/receiving unit 51 of the control apparatus 50*y* receiving the communication start request and the session ID, the service level determination unit 55 retrieves the service level of the session associated with the received session ID from the session management table (step S70).

The relay apparatus selection unit 56 of the control apparatus 50*y* selects one relay apparatus 30 from a plurality of relay apparatuses 30 managed by the control apparatus 50y based on the retrieved service level (step S71). Additionally, the process of step S71 is performed similarly to the process of step S64. In the following, the one relay apparatus 30 selected, in step S71, from the relay apparatuses 30y-1, 30y-2, . . . 30y-n managed by the control apparatus 50y is referred to as relay apparatus 30yy.

The session control unit 58 of the control apparatus 50y generates and manages a relay apparatus connection ID used for the destination terminal 10bb to connect to the relay apparatus 30yy (step S72). Additionally, the process of step S72 is performed similarly to the process of step S65.

The transmitting/receiving unit 51 of the control apparatus 50y transmits the communication start request, the URI of the relay apparatus 30 managed in step S72, the relay apparatus connection ID and relay apparatus connection password, and the session ID to the destination terminal 10bb (step S73).

In response to the transmitting/receiving unit 11 of the destination terminal 10bb receiving the communication start request, the communication control unit 13 causes the speaker 115 to output ringing tone. Then, the transmitting/receiving unit 11 transmits ringing information indicating that the ringing tone is being output to the control apparatus 50y to which the own terminal is connected (step S74). The terminal IDs of the request source terminal 10aa and the destination terminals 10bb are included in the ringing information.

In response to the transmitting/receiving unit 51 of the control apparatus 50y receiving the ringing information, the management unit 53 manages the communication state of the terminal 10 in accordance with the state transition rule illustrated in FIG. 2 (step S75-1). That is, the management unit 53 determines a new state of the request source terminal 10aa to be "Calling", and determines a new state of the destination terminal 10bb to be "Ringing". The management unit 53 transmits an update request of the terminal management table to the common management apparatus 60, where the update request requires that the state information "Calling" is recorded to be associated with the terminal ID of the request source terminal 10aa, and that the relay apparatus ID determined in step S71 and the state information "Ringing" are recorded to be associated with the terminal ID of the destination terminal 10bb.

In response to the transmitting/receiving unit 61 of the common management apparatus 60 receiving the update request, the storing/retrieving unit 69 records the relay apparatus ID and the state information associated with the terminal ID included in the update request in the terminal management table (FIG. 9B) of the common management apparatus 60. Then, by performing processes similar to steps S6-2-1, S6-2-2, etc., the terminal management tables of respective control apparatuses 50x, 50y, and 50z are synchronized with the terminal management table of the common management apparatus 60 (steps S75-2-1, S75-2-2, . . . ).

The transmitting/receiving unit 51 of the control apparatus 50y transmits the ringing information transmitted from the destination terminal 10bb to the request source terminal 10aa (step S76). Additionally, the IP address of the request source terminal 10aa is recorded in the terminal management table (FIG. 9B) of the control apparatus 50y because the terminal management table of the control apparatus 50y is synchronized with that of the common management apparatus 60 based on information items transmitted from the common management apparatus 60. Therefore, the transmitting/receiving unit 51 of control apparatus 50y can directly transmit the ringing information to the terminal 10aa not through the control apparatus 50x and without inquiring the destination information to the control apparatus 50x to which the terminal 10aa is connected.

On the other hand, in response to the accepting unit 12 of the destination terminal 10bb receiving an acceptance of communication start input through the user's operation, the transmitting/receiving unit 11 transmits communication start acceptance information indicating that the communication is allowed to start to the control apparatus 50y to which the own terminal is connected (step S77). The terminal IDs of the request source terminal 10aa and the destination terminal 10bb are included in the start acceptance information.

In response to the transmitting/receiving unit 51 of the control apparatus 50y receiving the start acceptance information, similarly to step S75-1, the management unit 53 determines a new state of the request source terminal 10aa and the destination terminal 10bb to be "Accepted" based on the received start acceptance information. Then, the management unit 53 transmits an update request of the terminal management table including the terminal IDs of the request source terminal 10aa and the destination terminal 10bb and the state information "Accepted" indicating the new states of the request source terminal 10aa and the destination terminal 10bb to the common management apparatus 60 (step S78-1). In response to the transmitting/receiving unit 61 of the common management apparatus 60 receiving the update request, the storing/retrieving unit 69 records the terminal IDs and the state information associated with each other in the terminal management table (FIG. 9B). Then, by performing processes similar to steps S6-2-1, S6-2-2, etc., the terminal management tables of respective control apparatuses 50x, 50y, and 50z are synchronized with the terminal management table of the common management apparatus 60 (steps S78-2-1, S78-2-2, . . . ).

Then, similarly to step S76, the transmitting/receiving unit 51 of the control apparatus 50y transmits the start acceptance information transmitted form the destination terminal 10bb to the request source terminal 10aa (step S79).

Figure 16A:
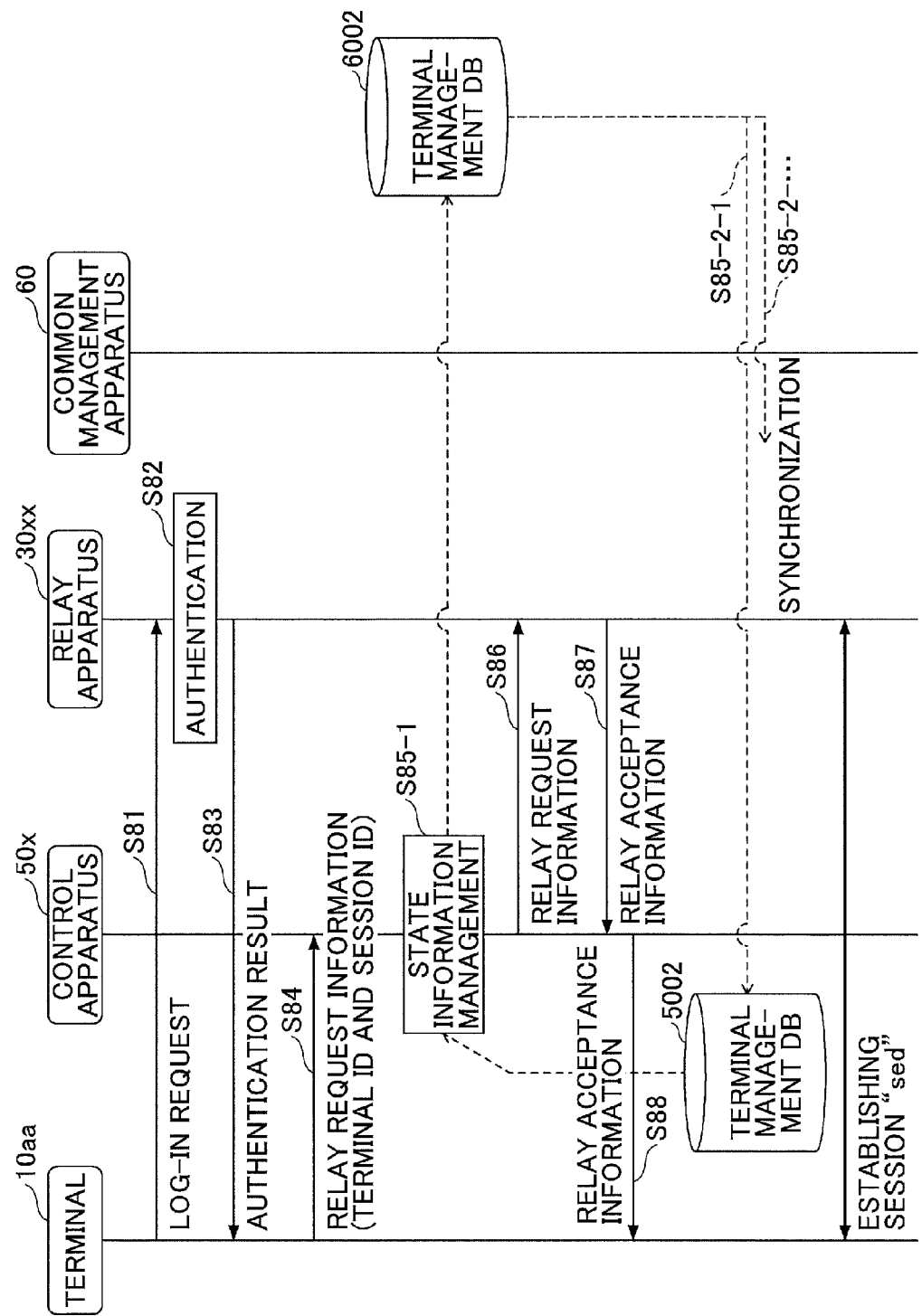
FIG. 16A is a sequence diagram illustrating an example process for starting to relay content data.
Figure 16B:
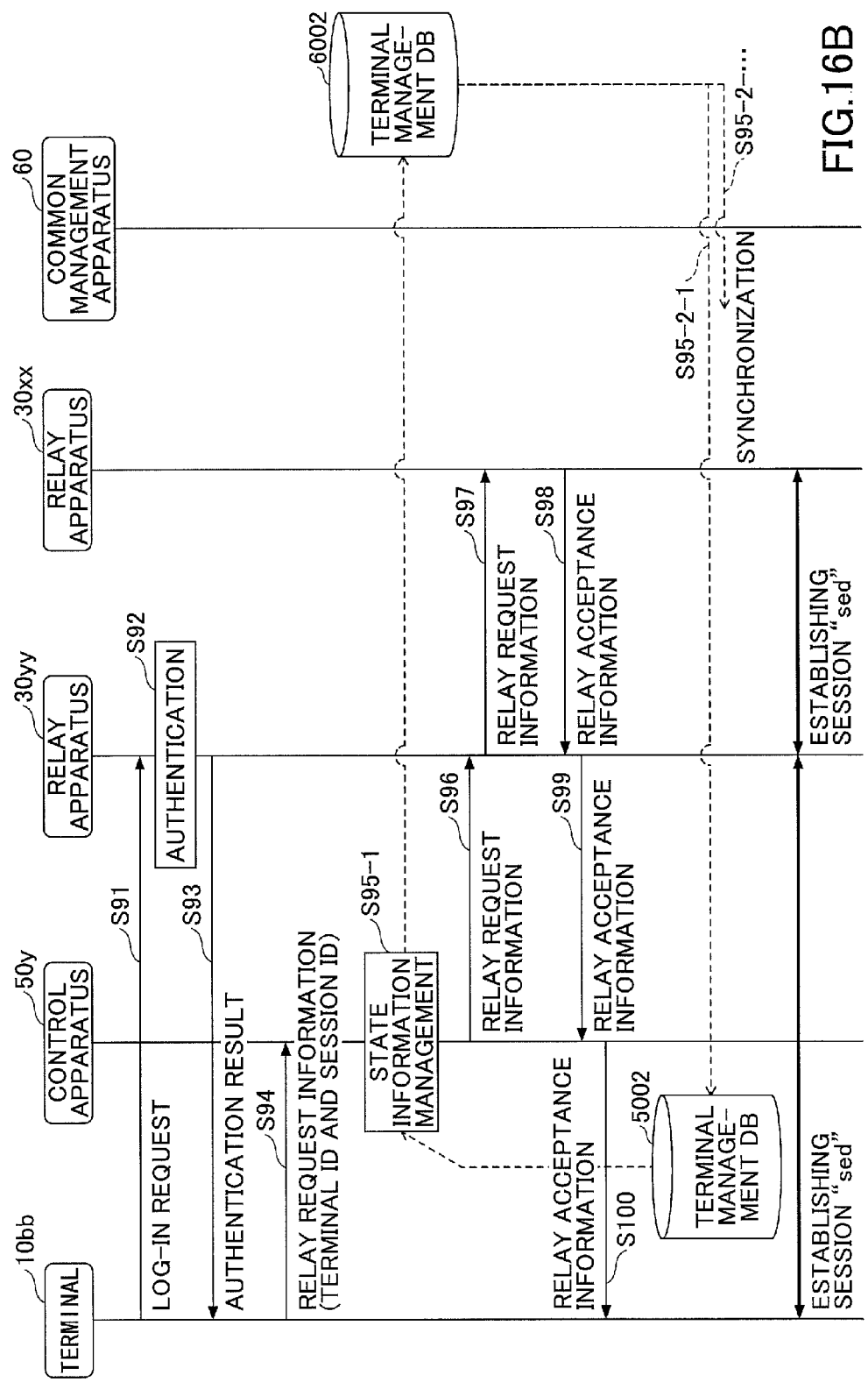
FIG. 16B is a sequence diagram illustrating another example process for starting to relay content data.

In the following, a process in which the request source terminal 10aa and the destination terminal 10bb request the relay apparatuses 30xx and 30yy to start relaying the content data will be described with reference to FIG. 16A and FIG. 16B, where terminals 10aa and 10bb are respectively connected to the relay apparatuses 30xx and 30yy. FIG. 16A and FIG. 16B are sequence diagrams illustrating the process for starting to relay the content data.

A process for establishing the session "sed" between the terminal 10aa and the relay apparatus 30xx so as to start to relay the content data transmitted between the terminals 10aa and 10bb is described with reference to FIG. 16A.

After receiving the start acceptance information (see step S77), the transmitting/receiving unit 11 of the request source terminal 10aa transmits a log-in request to the relay apparatus 30xx that is indicated by the URI received from the control apparatus 50x in step S68 (step S81). The terminal ID of the request source (source of the log-in request) terminal 10aa, the relay apparatus connection ID transmitted from the control apparatus 50x, and the relay apparatus connection password are included in the log-in request.

In response to receiving the log-in request, the authentication unit 32 of the relay apparatus 30xx authenticates the request source terminal 10aa (step S82). In this case, the authentication unit 32 inquires the control apparatus 50x whether the same combination of the terminal ID, the relay apparatus connection ID, and the relay apparatus connection password, which are included in the log-in request, are recorded in the connection management table (FIG. 9G) through the transmitting/receiving unit 31. In response to receiving the inquiry, with reference to the connection management table, the management unit 53 of the 50x transmits a response to the inquiry to the relay apparatus 30xx through the transmitting/receiving unit 51. In a case where the same combination of the terminal ID, the relay apparatus connection ID, and the relay apparatus connection password which are included in the log-in request is recorded in the connection management table of the control apparatus 50, the request source terminal is successfully authenticated. On the other hand, in a case where the same combination of the terminal ID, the relay apparatus connection ID, and the relay apparatus connection password which are included in the log-in request is not recorded in the connection management table of the control apparatus 50, the authentication of the request source terminal is resulted in failure. The transmitting/receiving unit 31 of the relay apparatus 30xx transmits the authentication result to the request source terminal 10aa (step S83).

The transmitting/receiving unit 11 of the request source (source of communication start request) terminal 10aa transmits relay request information indicating a request for staring to relay the content data to the control apparatus 50x (step S84). The terminal ID of the request source (source of relay request) terminal 10aa and the session ID "conf01.001xx" received in step S68 are included in the relay request information.

In response to the transmitting/receiving unit 51 of the control apparatus 50x receiving the relay request information, similarly to step S66-1, the management unit 53 determines the new state of the request source terminal 10aa to be "Busy" based on the received relay request information. Then, an update request of the terminal management table including the terminal ID of the request source terminal 10aa and the state information "Busy" indicating the new state of the request source terminal 10aa are transmitted to the common management apparatus 60 (step S85-1).

In response to the transmitting/receiving unit 61 of the common management apparatus 60 receiving the update request, the storing/retrieving unit 69 records the terminal ID and the state information associated with each other in the terminal management table (FIG. 9B) of the common management apparatus 60, where the terminal ID and the state information are included in the update request. Then, by performing processes similar to steps S6-2-1, S6-2-2, etc., the terminal management tables of respective control apparatuses 50x, 50y, and 50z are synchronized with the terminal management table of the common management apparatus 60 (steps S85-2-1, S85-2- . . . ).

The transmitting/receiving unit 51 of the control apparatus 50x transmits the relay request information transmitted from the request source terminal 10aa to the relay apparatus 30xx identified by the relay apparatus ID "001xx" that is associated with the terminal ID of the request source terminal 10aa in the terminal management table of the own control apparatus (step S86). In response to the relay request information, the transmitting/receiving unit 31 of the relay apparatus 30xx transmits relay acceptance information indicting acceptance of the relay request to the control apparatus 50x (step S87). In response to receiving the relay acceptance information transmitted from the relay apparatus 30xx, the transmitting/receiving unit 51 of the control apparatus 50x transmits the relay acceptance information to the request source terminal 10aa (step S88).

When the transmitting/receiving unit 31 of the relay apparatus 30xx receives the relay request information, the relay apparatus 30xx can recognize that the request source terminal 10aa will participate in the session identified by the session ID included in the relay request information. The relay apparatus 30xx starts to relay the content data transmitted from the terminal 10aa to other terminal(s) participating in the same session as the terminal 10aa, while the relay apparatus 30xx starts to relay the content data transmitted from other terminal(s) to the terminal 10aa. Thus, the session "sed" between the terminal 10aa and the relay apparatus 30xx is established.

In the following, a process for establishing a session "sed" between the terminal 10bb and the relay apparatus 30yy and between the relay apparatuses 30xx and 30yy so as to start to relay the content data between the terminals 10aa and 10bb are described with reference to FIG. 16B.

After transmitting the start acceptance information (step S77), the transmitting/receiving unit 11 of the terminal 10bb transmits a log-in request to the relay apparatus 30yy identified by the URI received from the control apparatus 50y in step S73 (step S91). The terminal ID of the request source (source of the log-in request) terminal 10bb and the relay apparatus connection ID and relay apparatus connection password transmitted from the control apparatus 50y are included in the log-in request.

In response to receiving the log-in request, the authentication unit 32 of the relay apparatus 30yy authenticates the request source terminal 10bb (step S92). In this case, the authentication unit 32 inquires the control apparatus 50y whether the same combination of the terminal ID, the relay apparatus connection ID, and the relay apparatus connection password, which are included in the log-in request, are recorded in the connection management table (FIG. 9G) through the transmitting/receiving unit 31. In response to receiving the inquiry, with reference to the connection management table, the management unit 53 of the management unit 53y transmits a response to the inquiry to the relay apparatus 30yy through the transmitting/receiving unit 51. Additionally, the process of step S92 is performed similarly to step S82.

The transmitting/receiving unit 31 of the relay apparatus 30yy transmits the authentication result to the request source terminal 10bb (step S93).

The transmitting/receiving unit 11 of the terminal 10bb transmits relay request information indicating a request for staring to relay the content data to the control apparatus 50y (step S94). The terminal ID of the request source (source of relay request) terminal 10bb and the session ID "conf01.001xx" received in step S73 are included in the relay request information.

In response to the transmitting/receiving unit 51 of the control apparatus 50y receiving the relay request information, similarly to step S75-1, the management unit 53 determines the new state of the request source terminal 10bb to be "Busy" based on the received relay request information. Then, an update request of the terminal management table including the terminal ID of the request source terminal 10bb and the state information "Busy" indicating the new state of the request source terminal 10bb are transmitted to the common management apparatus 60 (step S95-1).

In response to the transmitting/receiving unit 61 of the common management apparatus 60 receiving the update request, the storing/retrieving unit 69 records the terminal ID and the state information associated with each other in the terminal management table (FIG. 9B) of the common management apparatus 60, where the terminal ID and the state information are included in the update request. Then, by performing processes similar to steps S6-2-1, S6-2-2, etc., the terminal management tables of respective control apparatuses 50x, 50y, and 50z are synchronized with the terminal management table of the common management apparatus 60 (steps S95-2-1, S95-2- . . . ).

The transmitting/receiving unit 51 of the control apparatus 50y transmits the relay request information transmitted from the request source terminal 10bb to the relay apparatus 30yy identified by the relay apparatus ID "001yy" that is associated with the terminal ID of the request source terminal 10bb in the terminal management table of the own control apparatus (step S96). The session ID "conf01.001xx" includes "001xx" by which the relay apparatus 30xx that serves as the origin is identified. Therefore, the relay apparatus 30yy can recognize the relay apparatus 30xx to be the origin in the session "sed" in response to receiving the relay request information. Hence, the transmitting/receiving unit 31 of the relay apparatus 30yy transmits the relay request information transmitted from the control apparatus 50y to the relay apparatus 30xx that serves as the origin (step S97).

In response to the relay request information, the transmitting/receiving unit 31 of the relay apparatus 30xx transmits relay acceptance information indicting acceptance of the relay request to the relay apparatus 30yy (step S98). The transmitting/receiving unit 31 of the relay apparatus 30yy transmits the relay acceptance information to the control apparatus 50y as a response to the relay request information (step S99). In response to receiving the relay acceptance information transmitted from the relay apparatus 30yy, the transmitting/receiving unit 51 of the control apparatus 50y transmits the relay acceptance information to the request source (source of relay request) terminal 10bb (step S100).

When the transmitting/receiving unit 31 of the relay apparatus 30xx receives the relay request information, the relay apparatus 30xx can recognize that the terminal 10bb that is connected to the relay apparatus 30yy will participate in the session identified by the session ID included in the relay request information. The relay apparatus 30xx determines a transmission route of the content data based on information indicating connection between terminal 10 and relay apparatus 30 in the session "sed", thereby transmitting the determined transmission route to the relay apparatus 30yy. Here, the connection between terminal 10 and relay apparatus 30 means that each of combinations of relay apparatus 30 and terminal 10 that connects to the relay apparatuses 30 and participates in the session "sed". For example, the relay apparatus 30xx transmits an instruction to the relay apparatus 30yy, where the transmitted instruction is for transmitting the content data transmitted from the terminal 10bb to the relay apparatus 30xx and transmitting the content data transmitted from the relay apparatus 30xx to the terminal 10bb. In this way, the relay apparatus 30yy starts to transmit the content data transmitted from the terminal 10bb to the relay apparatus 30xx, while the relay apparatus 30yy starts to transmit the content data (from terminal 10aa) transmitted from the relay apparatus 30xx to the terminal 10bb. Thus, the sessions "sed" between the terminal 10bb and the relay apparatus 30yy and between the relay apparatuses 30xx and 30yy are established.

Upon all of sessions "sed" between the terminal 10aa and the relay apparatus 30xx, between the terminal 10bb and the relay apparatus 30yy, and between the relay apparatuses 30xx and 30yy being established, the terminals 10aa and 10bb can mutually transmit/receive the content data.

Figure 17:
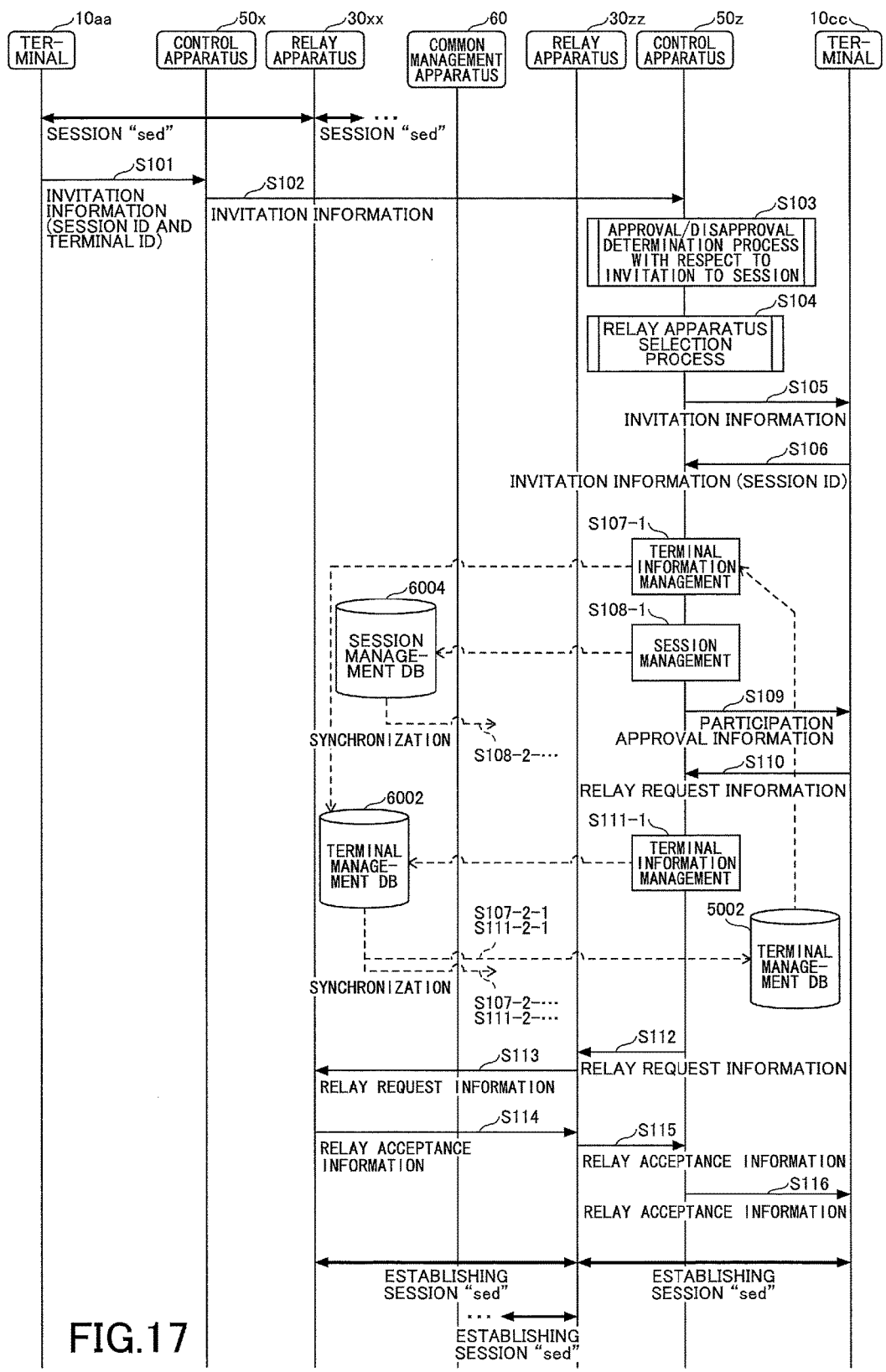
FIG. 17 is a sequence diagram illustrating a process in which the terminal participates in a session.

In the following, a process is described with reference to FIG. 17, in which a terminal 10cc connected to the control apparatus 50z participates in the session "sed" after establishing the sessions "sed" between the terminal 10aa and the relay apparatus 30xx, between the terminal 10bb and the relay apparatus 30yy, and between the relay apparatuses 30xx and 30yy. FIG. 17 is a sequence diagram illustrating the process in which the terminal 10 participates in the session "sed".

When the user's instruction to invite the terminal 10cc to the session "sed" is accepted by the accepting unit 12 of the terminal 10aa that has participated in the session "sed", the transmitting/receiving unit 11 transmits invitation information for inviting the terminal 10cc to the session "sed" to the control apparatus 50x to which the own terminal is connected (step S101). The session ID of the session "sed" and the terminal ID of the terminal 10cc to be invited are included in the invitation information.

In response to receiving the invitation information transmitted from the terminal 10aa, the transmitting/receiving unit 51 of the control apparatus 50x transmits the invitation information to the control apparatus 50z based on the terminal ID included in the invitation information, where the control apparatus 50z is associated with the area ID corresponding to the terminal 10cc (step S102). In response to the transmitting/receiving unit 51 of the control apparatus 50z receiving the invitation information, an invitation approval/disapproval determination unit 57 determines whether to have the terminal 10cc participate in the session based on the service level of the session and the service level available for the terminal 10cc (step S103).

Figure 18:
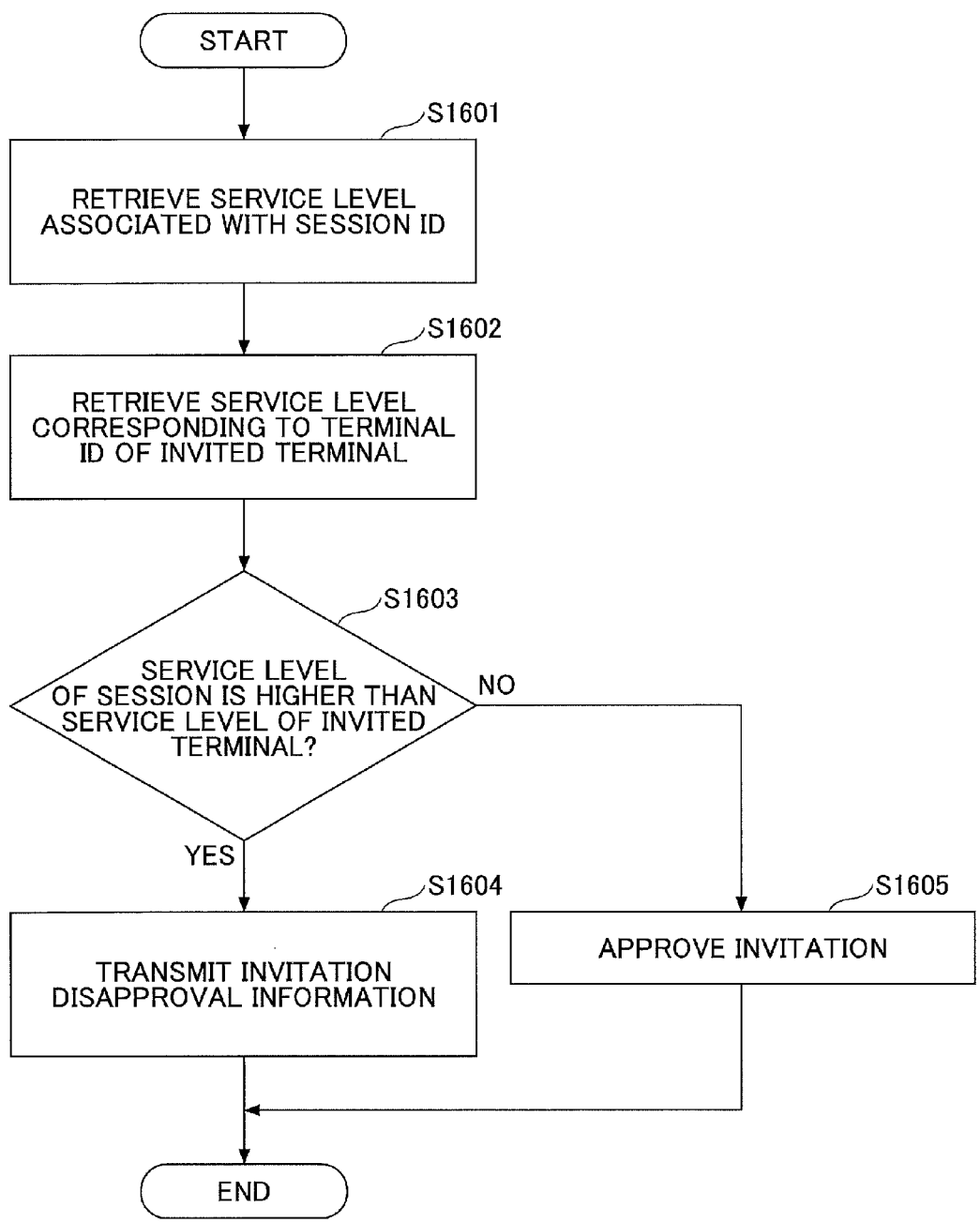
FIG. 18 is a flowchart illustrating an example approval/disapproval determination process with respect to an invitation to the session.

FIG. 18 is a flowchart illustrating an example approval/disapproval determination process with respect to an invitation to the session. Additionally, the process corresponds to the approval/disapproval determination process with respect to an invitation to the session performed in step S103 of FIG. 17.

The invitation approval/disapproval determination unit 57 retrieves the service level associated with the session ID included in the received invitation information from the session management table (step S1601).

Also, the service level available for the terminal 10 that is invited to the session is retrieved from the terminal management table. For example, the service level determination unit 55 retrieves value "4" of the service level corresponding to the terminal ID "01cc" of the terminal 10cc that is invited to the session (step S1602).

Further, whether the service level of the session is greater than the service level available for the invited terminal is determined (step S1603).

In a case where it is determined that the service level of the session is greater than the service level available for the invited terminal (YES in step S1603), the invitation is denied (disapproved) and invitation disapproval information is transmitted to the terminal that has transmitted the invitation information and to the invited terminal (step S1604).

In a case where it is determined that the service level of the session is not greater than the service level available for the invited terminal (NO in step S1603), the invitation is allowed (approved) (step S1605).

Figure 19:
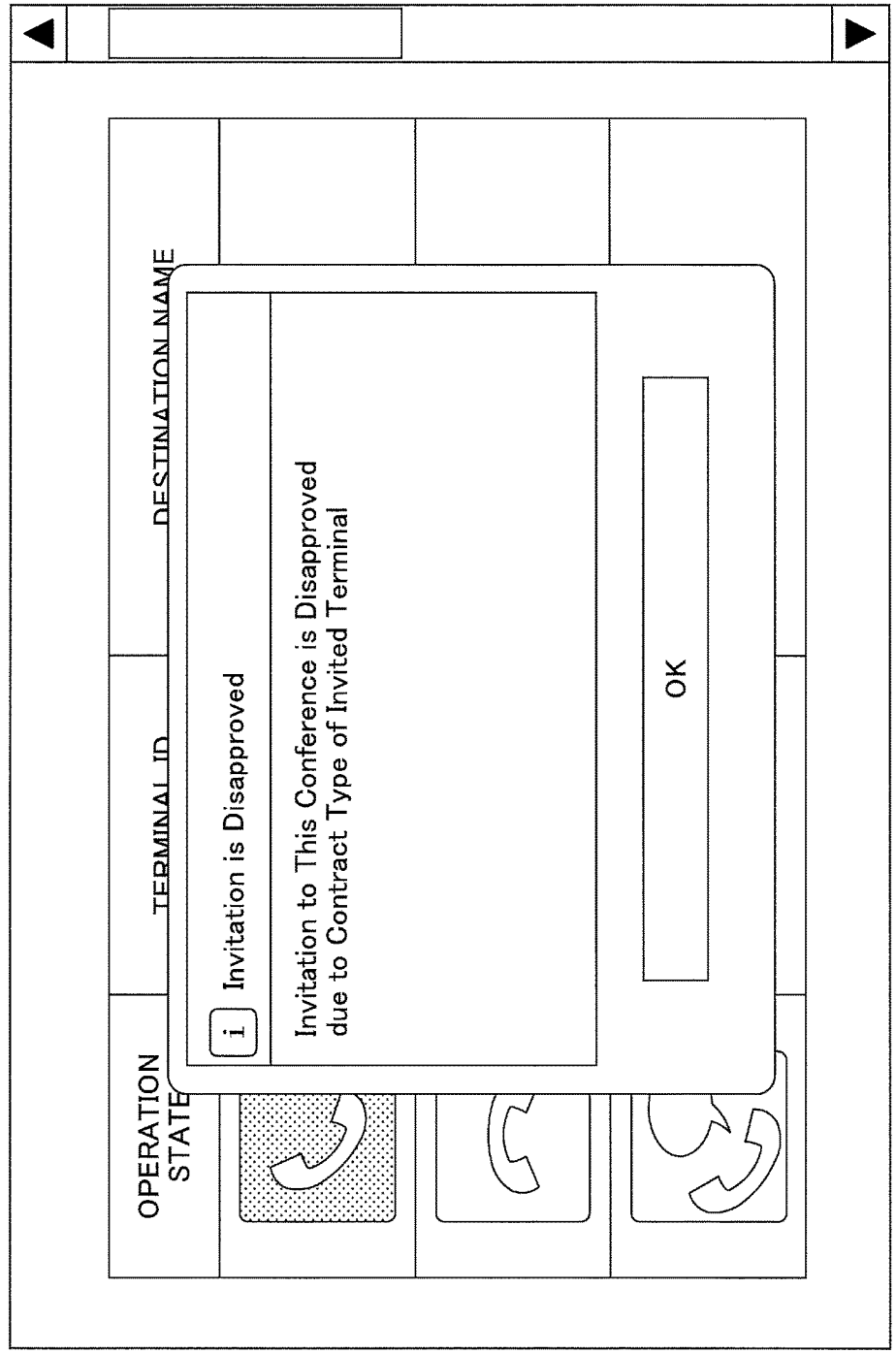
FIG. 19 is a diagram illustrating example invitation disapproval information displayed in the terminal.

FIG. 19 is a diagram illustrating example invitation disapproval information received from the control apparatus 50 in step S1604 of FIG. 18 respectively displayed in the terminal that has transmitted the invitation information and the invited terminal. For example, information that the invitation is denied due to the contract type of the invited terminal 10 is displayed and notified to the user.

Referring back to FIG. 17, the sequence diagram is continued to be described. In the following, descriptions are given in a case where the invitation is approved.

The relay apparatus selection unit 56 of the control apparatus 50z selects one relay apparatus 30 from the relay apparatuses 30 managed by the control apparatus 50z (step S104). Additionally, this process is performed similarly to step S64. In the following, the one relay apparatus 30 selected in step S104 from the relay apparatuses 30z-1, 30z-2, . . . 30z-n is referred to as a relay apparatus 30zz.

The transmitting/receiving unit 51 of the control apparatus 50z forwards the invitation information to the terminal 10cc based on the terminal ID included in the invitation information (step S105).

In response to receiving the invitation information transmitted from the control apparatus 50z, the transmitting/receiving unit 11 of the terminal 10cc transmits, based on a request from the user of the terminal 10cc, participation request information to the control apparatus 50z to which the own terminal is connected, where the participation request information indicates a request for participating in the session "sed" to which the terminal 10cc is invited by the terminal 10aa (step S106). The session ID of the session "sed" in which the terminal 10cc will participate is included in the participation request information.

In response to the transmitting/receiving unit 51 of the control apparatus 50z receiving the participation request information, similarly to step S66-1, the management unit 53 determines a new state of the request source (source of participation request) terminal 10cc to be "Accepted". The management unit 53 transmits an update request of the terminal management table to the common management apparatus 60, where the update request requires that the relay apparatus ID determined in step S104 and the state information "Accepted" are recorded to be associated with the terminal ID of the request source terminal 10cc (step S107-1).

In response to the transmitting/receiving unit 61 of the common management apparatus 60 receiving the update request, the storing/retrieving unit 69 records the relay apparatus ID and the state information associated with the terminal ID included in the update request in the terminal management table (FIG. 9B) of the common management apparatus 60. Then, by performing processes similar to steps S6-2-1, S6-2-2, etc., the terminal management tables of respective control apparatuses 50x, 50y, and 50z are synchronized with the terminal management table of the common management apparatus 60 (steps S107-2-1, S107-2- . . . ).

The management unit 53 manages information related to the session "sed" established between terminals 10aa, 10bb, and 10cc (step S108-1). In this case, the transmitting/receiving unit 51 transmits, based on a request from the management unit 53, an update request of the session management table including the session ID and the terminal ID of the request source terminal 10cc that are included in the participation request information to the common management apparatus 60.

In response to the transmitting/receiving unit 61 receiving the update request, the storing/retrieving unit 69 records the session ID and the terminal ID included in the update request in the session management table (FIG. 9D) of the common management apparatus 60 so as to be associated with each other. Then, by performing processes similar to steps S66-2-1, etc., the session management tables of respective control apparatuses 50x, 50y, and 50z are synchronized with the session management table of the common management apparatus 60 (steps S108-2 . . . ). The transmitting/receiving unit 51 of the control apparatus 50z transmits participation approval information indicating that the participation request is approved to the request source terminal 10cc (step S109).

After receiving the participation approval information, the transmitting/receiving unit 11 of the request source terminal 10cc transmits relay request information indicating a request for staring to relay the content data to the control apparatus 50z (step S110). The terminal ID of the request source terminal 10cc and the session ID "conf01.001xx" received in step S102 are included in the relay request information.

In response to the transmitting/receiving unit 51 of the control apparatus 50z receiving the relay request information, similarly to step S66-1, the management unit 53 determines the new state of the request source terminal 10cc to be "Busy" based on the received relay request information. Then, an update request of the terminal management table including the terminal ID of the request source terminal 10cc and the state information "Busy" indicating the new state of the request source terminal 10cc are transmitted to the common management apparatus 60 (step S111-1).

In response to the transmitting/receiving unit 61 of the common management apparatus 60 receiving the update request, the storing/retrieving unit 69 records the terminal ID and the state information associated with each other in the terminal management table (FIG. 9B) of the common management apparatus 60, where the terminal ID and the state information are included in the update request. Then, by performing processes similar to steps S6-2-1, S6-2-2, etc., the terminal management tables of respective control apparatuses 50x, 50y, and 50z are synchronized with the terminal management table of the common management apparatus 60 (steps S111-2-1, S111-2- . . . ).

The transmitting/receiving unit 51 of the control apparatus 50z transmits the relay request information transmitted from the request source terminal 10cc to the relay apparatus 30zz identified by the relay apparatus ID "001zz" that is associated with the terminal ID of the request source terminal 10cc in the terminal management table (FIG. 9B) of the own control apparatus (step S112). In this relay request information, the terminal ID of the request source (source of participation request) terminal 10cc is added to the relay request information transmitted from the terminal 10cc.

The session ID "conf01.001xx" includes "001xx" by which the relay apparatus 30xx that serves as the origin is identified. Therefore, the relay apparatus 30zz can recognize the relay apparatus 30xx to be the origin in the session "sed" in response to receiving the relay request information. Hence, the transmitting/receiving unit 31 of the relay apparatus 30zz transmits the relay request information transmitted from the control apparatus 50z to the relay apparatus 30xx that serves as the origin (step S113).

In response to the relay request information, the transmitting/receiving unit 31 of the relay apparatus 30xx transmits relay acceptance information indicting acceptance of the relay request to the relay apparatus 30zz (step S114). The transmitting/receiving unit 31 of the relay apparatus 30zz transmits the relay acceptance information to the control apparatus 50z as a response to the relay request information (step S115). In response to receiving the relay acceptance information transmitted from the relay apparatus 30zz, the transmitting/receiving unit 51 of the control apparatus 50z transmits the relay acceptance information to the request source terminal 10cc (step S116).

When the transmitting/receiving unit 31 of the relay apparatus 30xx receives the relay request information, the relay apparatus 30xx can recognize that the request source terminal 10cc will participate in the session identified by the session ID included in the relay request information. The relay apparatus 30xx determines a transmission route of the content data based on information indicating connection between terminal 10 and relay apparatus 30 in the session "sed", thereby transmitting the determined transmission route to the relay apparatuses 30yy and 30zz. Here, the connection between terminal 10 and relay apparatus 30 means that each of combinations of relay apparatus 30 and terminal 10 that connects to the relay apparatuses 30 and participates in the session "sed". For example, the relay apparatus 30xx transmits an instruction to the relay apparatus 30zz, where the transmitted instruction is for transmitting the content data transmitted from the terminal 10cc to the relay apparatuses 30xx and 30yy, and transmitting the content data of terminals 10aa and 10bb transmitted from the relay apparatus 30xx and 30zz to the terminal 10cc. In this way, the relay apparatus 30zz starts transmitting the content data transmitted from the terminal 10cc to the relay apparatuses 30xx and relay apparatus 30yy, while the relay apparatus 30zz starts transmitting the content data (from terminal 10aa) transmitted from the relay apparatus 30xx to the terminal 10bb.

Also, the relay apparatus 30xx transmits an instruction to the relay apparatus 30yy, where the transmitted instruction is for transmitting the content data transmitted from the terminal 10bb to the relay apparatuses 30zz, and transmitting the content data of terminals 10cc transmitted from the relay apparatus 30zz to the terminal 10bb. In this way, the relay apparatus 30yy starts to transmit the content data transmitted from the terminal 10bb to the relay apparatuses 30zz, while the relay apparatus 30yy starts to transmit the content data (from terminal 10cc) transmitted from the relay apparatus 30zz to the terminal 10bb.

Thus, the sessions "sed" between the terminal 10cc and the relay apparatus 30zz and between the relay apparatus 30zz and relay apparatuses 30xx and 30yy are established.

Upon all of sessions "sed" between the terminal 10cc and the relay apparatus 30zz and between the relay apparatus 30zz and relay apparatuses 30xx and 30yy being established, the terminals 10aa, 10bb, and 10cc can mutually transmit/receive the content data.

<Exit from Session "sed">

In the following, a process will be described with reference to FIG. 20A, in which the terminal 10aa that has participated in the session "sed" established between terminals 10aa, 10bb, and 10cc exits from the session. FIG. 20A and FIG. 20B are sequence diagrams illustrating a process in which the terminal 10aa exits from the session "sed".

The transmitting/receiving unit 11 of the terminal 10aa transmits, based on a request from the user, termination request information to the control apparatus 50x, where the termination request information indicates a request for termination of the communication (step S121). The session ID "conf01.001xx" of the session "sed" in which the terminal 10aa has participated included in the termination request information.

In response to the transmitting/receiving unit 51 of the control apparatus 50x receiving the termination request information, similarly to step S66-1, the management unit 53 determines the new state of the request source (source of termination request) terminal 10aa to be "None" based on the received termination request information. Then, an update request of the terminal management table including the terminal ID of the request source terminal 10aa and the state information "None" indicating the new state of the request source terminal 10aa are transmitted to the common management apparatus 60 (step S122-1).

In response to the transmitting/receiving unit 61 of the common management apparatus 60 receiving the update request, the storing/retrieving unit 69 records the terminal ID and the state information associated with each other in the terminal management table (FIG. 9B) of the common management apparatus 60, where the terminal ID and the state information are included in the update request. Then, by performing processes similar to steps S6-2-1, S6-2-2, etc., the terminal management tables of respective control apparatuses 50x, 50y, and 50z are synchronized with the terminal management table of the common management apparatus 60 (steps S122-2-1, S122-2- . . . ).

The management unit 53 manages information related to the session "sed" from which the terminal 10aa exits (step S123-1). In this case, the transmitting/receiving unit 51 transmits, based on a request from the management unit 53, an update request of the session management table to the common management apparatus 60, where the update request includes the session ID that has been included in the termination request information and the terminal ID of the terminal 10aa exiting from the session "sed". In response to the transmitting/receiving unit 61 of the common management apparatus 60 receiving the update request, the storing/retrieving unit 69 deletes the terminal ID of the terminal 10aa that is associated with the session ID included in the update request from the session management table (FIG. 9D) of the common management apparatus 60. Then, by performing processes similar to steps S67-2- . . . , etc., the session management tables of respective control apparatuses 50x, 50y, and 50z are synchronized with the session management table of the common management apparatus 60 (steps S123-2- . . . ).

The transmitting/receiving unit 51 of the control apparatus 50x transmits the termination request information transmitted from the request source terminal 10aa to the relay apparatus 30xx identified by the relay apparatus ID "001xx" that is associated with the terminal ID of the request source terminal 10aa in the terminal management table of the own control apparatus (step S124).

When the transmitting/receiving unit 31 of the relay apparatus 30xx receives the termination request information, the relay apparatus 30xx can recognize that the request source terminal 10aa will exit from the session "sed" established between the terminals 10aa, 10bb, and 10cc. The relay apparatus 30xx determines a transmission route of the content data based on information indicating connection between terminal 10 and relay apparatus 30 in the session "sed", thereby transmitting the determined transmission route to the relay apparatuses 30yy and 30zz. Here, the connection between terminal 10 and relay apparatus 30 means that each of combinations of relay apparatus 30 and terminal 10 that connects to the relay apparatuses 30 and still participates in the session "sed" after the terminal 10aa exits from the session. For example, the relay apparatus 30xx transmits an instruction to the relay apparatus 30yy, where the transmitted instruction is for transmitting the content data transmitted from the terminal 10bb to the relay apparatuses 30zz, and transmitting the content data of terminals 10cc transmitted from the relay apparatus 30zz to the terminal 10bb. Also, the relay apparatus 30xx transmits an instruction to the relay apparatus 30zz, where the transmitted instruction is for transmitting the content data transmitted from the terminal 10cc to the relay apparatus 30yy, and transmitting the content data of terminal 10bb transmitted from the relay apparatus 30yy to the terminal 10cc.

Thus, the terminal 10*aa* is excluded from the session "sed" (step S125), while the terminals 10*bb* and 10*cc* can continue to mutually transmit/receive the content data.

In the following, a process is described with reference to FIG. 20B, in which the terminal 10*bb* exits from the session "sed" established between the terminals 10*bb* and 10*cc* after the terminal 10*aa* exits from the session. The transmitting/receiving unit 11 of the terminal 10*bb* transmits, based on a request from the user, a termination request indicating the request for terminating the communication to the control apparatus 50*y* (step S131). The session ID "conf01.001*xx*" of the session "sed" in which the terminal 10*bb* has participated is included in the termination request.

In response to the transmitting/receiving unit 51 of the control apparatus 50*y* receiving the termination request information, similarly to step S66-1, the management unit 53 determines the new state of the request source terminal (source of termination request) 10*bb* to be "None" based on the received termination request information. The transmitting/receiving unit 51 of the control apparatus 50*y* transmits a request for updating the terminal management table (update request) to the common management apparatus 60 (step S132-1), where the terminal ID of the request source terminal 10*bb* and the state information "None" are included in the update request.

In response to the transmitting/receiving unit 61 of the common management apparatus 60 receiving the update request, the storing/retrieving unit 69 records the terminal ID and the state information associated with each other in the terminal management table (FIG. 9B) of the common management apparatus 60, where the terminal ID and the state information are included in the update request. Then, by performing processes similar to steps S6-2-1, S6-2-2, etc., the terminal management tables of respective control apparatuses 50*x*, 50*y*, and 50*z* are synchronized with the terminal management table of the common management apparatus 60 (steps S132-2-1, S132-2-2, . . . ).

The management unit 53 manages information related to the session "sed" from which the terminal 10*bb* exits (step S133-1). In this case, the transmitting/receiving unit 51 transmits, based on a request from the management unit 53, an update request of the session management table to the common management apparatus 60, where the update request includes the session ID that has been included in the termination request information and the terminal ID of the terminal 10*bb* exiting from the session "sed".

In response to the transmitting/receiving unit 61 of the common management apparatus 60 receiving the update request, the storing/retrieving unit 69 deletes the terminal ID of the terminal 10*bb* that is associated with the session ID included in the update request from the session management table (FIG. 9D) of the common management apparatus 60. Then, by performing processes similar to steps S67-2- . . . , etc., the session management tables of respective control apparatuses 50*x*, 50*y*, and 50*z* are synchronized with the session management table of the common management apparatus 60 (steps S133-2- . . . ).

The transmitting/receiving unit 51 of the control apparatus 50*y* transmits the termination request information transmitted from the request source terminal 10*bb* to the relay apparatus 30*yy*, where the relay apparatus 30*yy* is identified by the relay apparatus ID "001*yy*" that is associated with the terminal ID of the request source terminal 10*bb* in the terminal management table (FIG. 9B) of the own control apparatus 50 (step S134). The session ID "conf01.001*xx*" includes "001*xx*" by which the relay apparatus 30*xx* that serves as the origin is identified. Therefore, the relay apparatus 30*yy* can recognize the relay apparatus 30*xx* to be the origin in the session "sed" in response to receiving the termination request information. Hence, the transmitting/receiving unit 31 of the relay apparatus 30*yy* transmits the termination request information transmitted from the control apparatus 50*y* to the relay apparatus 30*xx* that serves as the origin (step S135).

When the transmitting/receiving unit 31 of the relay apparatus 30*xx* receives the termination request information, the relay apparatus 30*xx* can recognize that the request source terminal 10*bb* will exit from the session "sed" established between the terminals 10*bb* and 10*cc*. The relay apparatus 30*xx* determines a transmission route of the content data based on information indicating connection between terminal 10 and relay apparatus 30 in the session "sed", thereby transmitting the determined transmission route to the relay apparatuses 30*yy* and 30*zz*. Here, the connection between terminal 10 and relay apparatus 30 means that each of combinations of relay apparatus 30 and terminal 10 that connects to the relay apparatuses 30 and still participates in the session "sed" after the terminal 10*bb* exits from the session. For example, the relay apparatus 30*xx* transmits an instruction for terminating the sessions "sed" to the relay apparatus 30*yy*, where the sessions "sed" to be terminated are the session "sed" between the terminal 10*bb* and the relay apparatus 30*yy* and the session "sed" between the relay apparatus 30*xx* and the relay apparatus 30*yy*. Also, the relay apparatus 30*xx* transmits an instruction to the relay apparatus 30*zz*, where the instruction is for reverting the content data transmitted from the terminal 10*cc* to the terminal 10*cc*. Thus, the terminal 10*bb* is excluded from the session "sed" (step S137), while the terminal 10*cc* can continue to participate in the session "sed", in which the transmitted content data is received by own terminal through the relay apparatus 30*zz*.

<Log-Out Process>

Figure 21:
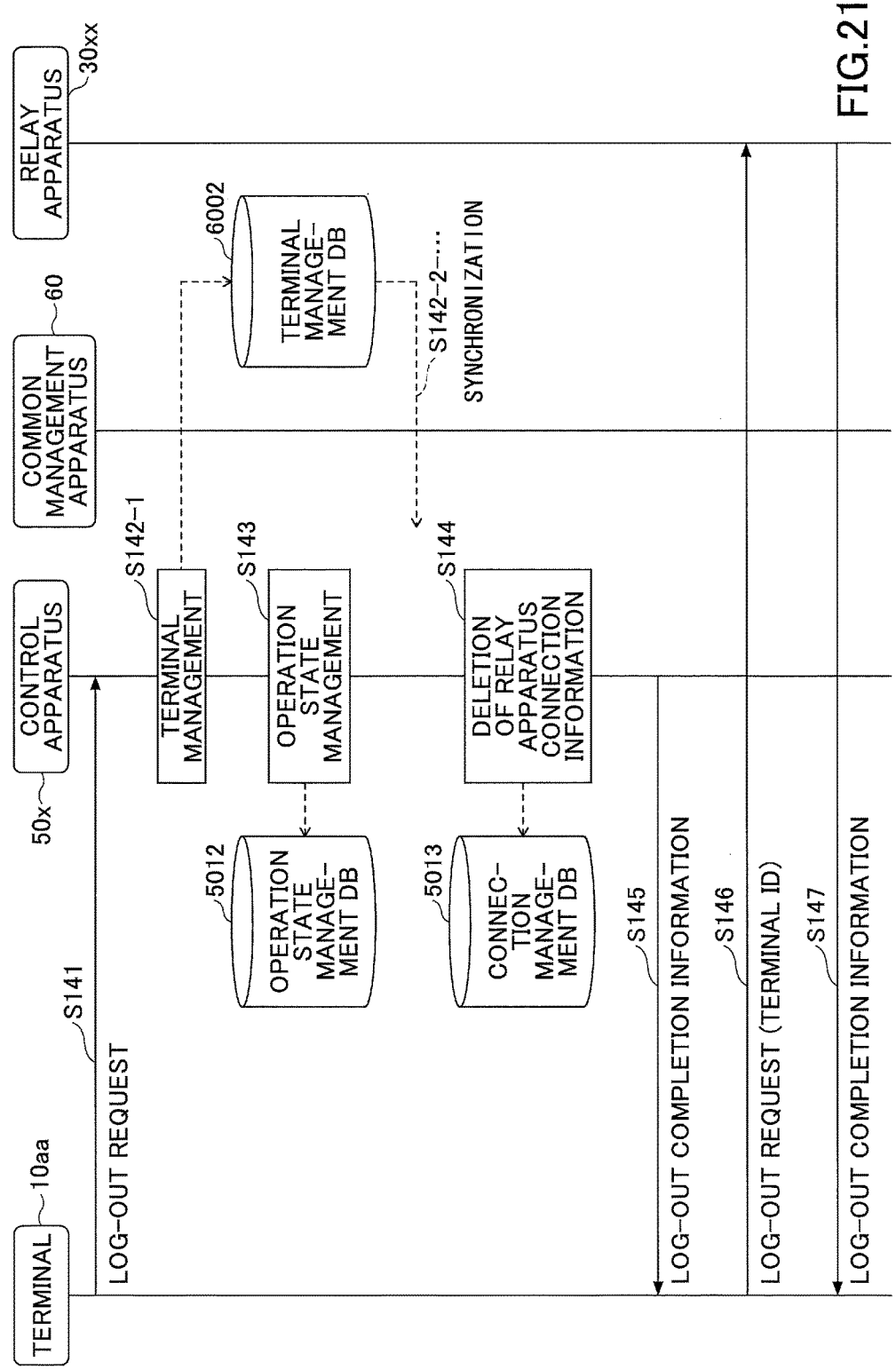
FIG. 21 is a sequence diagram illustrating an example log-out process of the terminal.

In the following, a process will be described with reference to FIG. 21, in which the terminal 10 logs-out from the control apparatus 50. FIG. 21 is a sequence diagram illustrating an example log-out process of the terminal 10. In the following, a process will be described, in which the terminal 10*aa* logs-out from the control apparatus 50*x* after the terminal 10*aa* has exited from the session "sed" between the terminals 10*bb* and 10*cc*.

The transmitting/receiving unit 11 of the terminal 10*aa* transmits, based on a request from the user, a log-out request to the control apparatus 50*x* to which the terminal 10*aa* is connected (step S141). In response to receiving the log-out request, the transmitting/receiving unit 51 of the control apparatus 50*x* transmits, based on a request from the management unit 53, a request for deleting the area ID, the IP address, and the relay apparatus ID corresponding to the terminal 10*aa* that is logs-out from the control apparatus 50*x* from the terminal management table (FIG. 9B), where the area ID, the IP address, and the relay apparatus ID are associated with the terminal ID of the terminal 10*aa* in the terminal management table (step S142-1).

In response to the transmitting/receiving unit 61 of the common management apparatus 60 receiving the request, the storing/retrieving unit 69 deletes the area ID, the IP address, and the relay apparatus ID associated with the received terminal ID from the terminal management table of the common management apparatus 60 (FIG. 9B). Then, by performing processes similar to steps S6-2-1, S6-2-2, etc., the terminal management tables of respective control apparatuses 50*x*, 50*y*, and 50*z* are synchronized with the terminal management table of the common management apparatus 60

(steps S142-2- . . . ). The storing/retrieving unit 59 records, based on a request from the management unit 53, the state information "Offline" associated with the terminal ID of the request source (source of log-out request) terminal 10aa in the operation state management table (FIG. 9F) (step S143). The updated operation state "Offline" is transmitted to destination candidate terminals of the terminal 10aa in steps S48-S51-2.

Also, the management unit 53 deletes a record (of connection management DB) including the terminal ID of the request source terminal 10aa from the connection management table (FIG. 9G) of the control apparatus 50x (step S144). Thus, the terminal ID of the terminal 10aa, the relay apparatus connection ID, and the relay apparatus connection password associated with the terminal ID are deleted from the connection management table.

The transmitting/receiving unit 51 of the control apparatus 50x transmits log-out completion information indicating a completion of the log-out operation to the request source terminal 10aa (step S147).

Also, the terminal 10aa transmits a log-out request to the relay apparatus 30xx. The relay apparatus 30xx transmits log-out completion information to the terminal 10aa in response to completing processes performed for the log-out operation of the terminal 10aa.

Thus, the terminal 10aa finishes the process for log-out from the control apparatus 50x and the relay apparatus 30.

<Example Variation>

Although, in the embodiment described above, the common management apparatus 60 is separately provided from the control apparatus 50, this is not a limiting example. In another embodiment of the present disclosure, the common management apparatus 60 may be integrated with any one of the control apparatuses 50x, 50y, and 50z. In this case, the one control apparatus 50 includes respective functional units of the common management apparatus 60. For example, an average time taken for the control apparatus 50 to access the common management apparatus 60 in the entire communication system 1 can be reduced when the control apparatus 50 that is most frequently connected to the terminal 10 or that is connected to highest number of terminals 10 includes the respective functional units of the common management apparatus 60.

Additionally, instead of selecting the relay apparatus 30 based on the service level of the session in step S1502, the relay apparatus 30 may be selected based on the service level selected by other control apparatuses 50. In this case, for example, the relay apparatus 30 may be selected as described as follows. The session control unit 58 of the control apparatus 50x that is connected to the terminal 10aa records the service level of the selected relay apparatus 30xx in the session management table, etc., where the terminal 10aa is a source of the communication start request. Instead of preforming step S1502, the control apparatus 50yy that is connected to the destination terminal 10bb selects the relay apparatus 30yy, where service level of the selected relay apparatus 30yy is equal to or less than the service level of the session and closest to the service level of the relay apparatus 30xx among the relay apparatuses.

In this case, for example, a relay apparatus can be selected by the control apparatus 50 connected to the destination terminal efficiently. For example, the relay apparatus 30xx selected by the control apparatus 50x connected to the request source terminal has low processing capability corresponding to service level "4" while the service level of the session is "8", and a relay apparatus 30y-1 whose processing capability corresponds to service level "7" and a relay apparatus 30y-2 whose processing capability corresponds to service level "5" are available for this session. In this case the control apparatus 50y may select any one of the relay apparatuses 30y-1 and 30y-2 because respective service levels corresponding to relay apparatuses 30y-1 and 30y-2 are equal to or less than the service level of the session. However, when the service level corresponding to the relay apparatus 30xx is only "4", the processing capability of relay apparatus 30y-1 (corresponding to service level "7") is unlikely to be required in this session because a transmission quality of the image data cannot be increased due to the low processing capability of relay apparatus 30xx. Therefore, it is reasonable, in this case, that the control apparatus 50y selects the relay apparatus 30y-2 whose processing capability corresponds to service level "5" because the service level of the relay apparatus 30y-2 is closer to the service level of the relay apparatus 30xx than the service level of the relay apparatus 30y-1 and the relay apparatus 30y-1 having higher processing capability can be saved for another session. That is, the control apparatus (e.g., 50x) connected to the destination terminal can select the relay apparatus in a manner such that a relay apparatus whose service level is equal to or less than the service level of the session and closest to the service level of the other relay apparatus (e.g., 30xx) is chosen from relay apparatuses (e.g., 30y-1 and 30y-2) managed by own control apparatus. In this way, it can be prevented that the relay apparatus 30 whose service level is too high is selected.

The service level of the relay apparatus 30 may be dynamically changed in accordance with usage state of the relay apparatus 30, and the like. For example, the session control unit 58 of the control apparatus 50 manages number of sessions in which the relay apparatus is used with respect to every relay apparatus managed by own control apparatus 50, or CPU utilization of every relay apparatuses managed by own control apparatus 50, and the like. The service level of the respective relay apparatuses 30 may be updated in accordance with the number of the sessions or the CPU utilization. Thus, for example, in a case where a relay apparatus 30 is used in a plurality of sessions for relaying high-resolution image data, the service level of the relay apparatus 30 can be updated to be lower since residual processing capability of the relay apparatus 30 is low.

Instead of performing the approval/disapproval determination process with respect to an invitation to the session in step S103 of FIG. 17, the session service level determination process depicted as step S63 in FIG. 13 may be performed to update the service level of the session. In this case, the service level of the session may be re-determined to be lowest value, determined to be highest value, determined to be an average value, etc., based on the service levels corresponding to the terminals 10aa, 10bb, and 10cc participating in the session, thereby re-determining the relay apparatuses 30xx, 30yy, and 30zz to which the terminal 10aa, 10bb, and 10cc are connected.

Herein above, although the present disclosure has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. For example, the management system 5 may include only one control apparatus 50. In this case, the one control apparatus 50 may include respective functional units of the common management apparatus 60 and other control apparatuses 50. The present application claims priority under 35 U.S.C. § 119 to Japanese Patent Application No. 2015-170371 filed on Aug. 31, 2015. The contents of which are incorporated herein by reference in their entirety.

What is claimed is:

1. A management system for managing a session for transmitting content data between a first terminal and a second terminal via a first relay apparatus and a second relay apparatus, the management system comprising:
   a plurality of control apparatuses including a first control apparatus and a second control apparatus, and
   a common control apparatus including a memory containing a management table
   wherein the first control apparatus includes:
   a first management table;
   a first determination unit configured to determine a first transmission quality of the content data transmitted in the session based on a transmission quality of the content data available for the first terminal and;
   a first selection unit configured to select the first relay apparatus, among a first group including a plurality of relay apparatuses that are located in a first predetermined area, to which the first terminal is to be connected based on the first transmission quality; and
   wherein the second control apparatus includes:
   a second management table;
   a second determination unit configured to determine a second transmission quality of the content data transmitted in the session based on a transmission quality of the content data available for the second terminal, and
   a second selection unit configured to select the second relay apparatus, among a second group including a plurality of relay apparatuses that are located in a second predetermined area, to which the second terminal is to be connected based on the second transmission quality,
   wherein the common control apparatus is configured to update the management table in response to receiving an update request from the first control apparatus and the second control apparatus, respectively, and
   wherein the common control apparatus is configured to synchronize the first and second management tables with the updated management table after the management table of the common control apparatus is updated.

2. The management system according to claim 1, wherein each of the first and second determination units determines a transmission quality of the content data transmitted in the session based on one of average of the transmission quality of the content data available for the first terminal and the transmission quality available for the second terminal, a lower quality of the transmission quality of the content data available for the first terminal and the transmission quality available for the second terminal, and a higher quality of the transmission quality of the content data available for the first terminal and the transmission quality available for the second terminal.

3. The management system according to claim 1, wherein the second selection unit selects the second relay apparatus according to the first transmission quality of the content data provided by the first relay apparatus.

4. The management system according to claim 1, wherein each of the first and second control apparatuses further comprise an invitation approval determination unit configured to approve or disapprove an invitation to the session, wherein a third terminal is invited to the session based on a request from the first terminal or second terminal after content data transmission between the first terminal and the second terminal using the session has started, the determination of the invitation approval determination unit is performed based on the transmission quality determined by the determination unit and a transmission quality of the content data available for the third terminal.

5. The management system according to claim 1, wherein in response to a third terminal being invited to the session based on a request from the first terminal or second terminal after content data transmission between the first terminal and the second terminal using the session has started, each of the first and second determination units update the transmission quality of the content data transmitted in the session based on the transmission quality of the content data available for the first terminal, the transmission quality available for the second terminal, and a transmission quality of the content data available for the third terminal.

6. A method for managing a session by a management system in which a first terminal and a second terminal transmit content data via a first relay apparatus and a second relay apparatus,
   said management system comprising:
   a plurality of control apparatuses including a first control apparatus having a first management table and a second control apparatus having a second management table, and
   a common control apparatus including a memory containing a management table,
   the method comprising:
   determining, by the first control apparatus, a first transmission quality of the content data transmitted in the session based on a transmission quality of the content data available for the first terminal;
   selecting, by the first control apparatus the first relay apparatus, among a first group including a plurality of relay apparatuses that are located in a first predetermined area, to which the first terminal is to be connected based on the first transmission quality;
   determining, by the second control apparatus, a second transmission quality of the content data transmitted in the session based on a transmission quality of the content data available for the second terminal;
   selecting, by the second control apparatus, the second relay apparatus, among a second group including a plurality of relay apparatuses that are located in a second predetermined area, to which the second terminal is to be connected based on the second transmission quality,
   updating the management table at the common control apparatus in response to receiving a update request from the first control apparatus and the second control apparatus, respectively, and
   synchronizing the first and second management tables with the updated management table after the management table of the common control apparatus is updated.

7. The management system according to claim 1, wherein the first and second transmission qualities of the first and second terminal are predetermined values based on their contracts.

8. The management system according to claim 7, wherein the first and second transmission qualities of the first and second terminal are predetermined based on specifications of the first and second relay apparatuses.

9. The management system according to claim 7, wherein the contracts includes at least premium, regular and trial courses and wherein the premium course costs more than the regular course and more than the trial course, and provides the transmission quality higher than the regular and the trial courses.

10. The management system according to claim 1, wherein each of the first and second selection units is further configured to select the first or the second relay apparatus based on utilization rate when each of the first and second selection units selects two or more relay apparatuses.

11. The management system according to claim 1, wherein each of the first and second selection units is further configured to select the first or the second relay apparatus based on physical distance from the first terminal or the second terminal that is determined based on IP addresses of the first or second terminal when at least one of the first and second selection units selects two or more relay apparatuses.

12. The management system according to claim 1, wherein each management tables includes:
- a terminal management table managing information regarding each terminal including an available service level,
- a destination management list table managing ID of each available destination terminal in association with a communication initiating terminal, and
- a session management table managing information regarding a session including the service level of the session in association with a session ID.

* * * * *